US010969535B2

(12) United States Patent
Sieberth et al.

(10) Patent No.: US 10,969,535 B2
(45) Date of Patent: Apr. 6, 2021

(54) WAVEGUIDE LUMINAIRE WITH SIDE GLARE SHIELD

(71) Applicant: IDEAL Industries Lighting LLC, Durham, NC (US)

(72) Inventors: Bernd R. Sieberth, Salem, WI (US); Brad Thomas, Cary, NC (US)

(73) Assignee: IDEAL INDUSTRIES LIGHTING LLC, Durham, NC (US)

( * ) Notice: Subject to any disclaimer, the term of this patent is extended or adjusted under 35 U.S.C. 154(b) by 0 days.

(21) Appl. No.: 16/394,629

(22) Filed: Apr. 25, 2019

(65) Prior Publication Data
US 2020/0264364 A1 Aug. 20, 2020

Related U.S. Application Data

(60) Provisional application No. 62/805,618, filed on Feb. 14, 2019.

(51) Int. Cl.
| F21V 8/00 | (2006.01) |
| F21S 8/04 | (2006.01) |
| F21V 1/00 | (2006.01) |
| F21V 1/14 | (2006.01) |
| F21Y 115/10 | (2016.01) |

(52) U.S. Cl.
CPC ............ *G02B 6/0078* (2013.01); *F21S 8/046* (2013.01); *F21V 1/00* (2013.01); *F21V 1/143* (2013.01); *G02B 6/0048* (2013.01); *G02B 6/0051* (2013.01); *G02B 6/0055* (2013.01); *G02B 6/0068* (2013.01); *G02B 6/0073* (2013.01); *F21V 2200/20* (2015.01); *F21Y 2115/10* (2016.08)

(58) Field of Classification Search
CPC ...... F21V 2200/20; F21V 17/164; F21V 1/14; F21V 1/143; F21S 8/04; F21S 8/06; F21S 8/046; G02B 6/0078; G02B 6/0048; G02B 6/0051; G02B 6/0055; G02B 6/0068; G02B 6/0073
See application file for complete search history.

(56) References Cited

U.S. PATENT DOCUMENTS

| 8,162,497 B2 * | 4/2012 | Gonzalez | G03B 15/02 362/16 |
| 8,541,795 B2 | 9/2013 | Keller et al. | |
| 8,975,827 B2 | 3/2015 | Chobot et al. | |
| 9,303,823 B2 | 4/2016 | Hu et al. | |
| 9,791,110 B2 | 10/2017 | Hu et al. | |
| 9,818,919 B2 | 11/2017 | Lowes et al. | |

(Continued)

FOREIGN PATENT DOCUMENTS

WO     2014120971 A1    8/2014

*Primary Examiner* — Rajarshi Chakraborty
*Assistant Examiner* — Michael Chiang
(74) *Attorney, Agent, or Firm* — Coats & Bennett, PLLC

(57) ABSTRACT

A luminaire configured to emit light in different directions. The luminaire may include a frame and optical waveguides disposed in the frame and positioned at different angles relative to one another to direct light outward in multiple different directions. At least one LED may be associated with each optical waveguide. A shield may be associated with the frame and configured to reduce the light from being directed in one or more of the different directions.

20 Claims, 36 Drawing Sheets

(56) References Cited

U.S. PATENT DOCUMENTS

| | | | |
|---|---|---|---|
| 2007/0211474 A1* | 9/2007 | Chen | F21V 1/14 362/351 |
| 2013/0088890 A1* | 4/2013 | Knapp | G02B 6/0038 362/609 |
| 2013/0201561 A1* | 8/2013 | McCluney | F21S 11/00 359/597 |
| 2014/0355302 A1* | 12/2014 | Wilcox | F21V 5/002 362/609 |
| 2015/0351169 A1 | 12/2015 | Pope et al. | |
| 2017/0201659 A1* | 7/2017 | Miyakawa | G03B 15/05 |
| 2017/0299153 A1* | 10/2017 | Hsu | F21V 17/002 |
| 2018/0299092 A1* | 10/2018 | Orisich | G02B 6/001 |
| 2018/0306966 A1* | 10/2018 | Conrad | G02B 6/0055 |
| 2018/0320873 A1* | 11/2018 | Veltri | F21S 8/033 |

\* cited by examiner

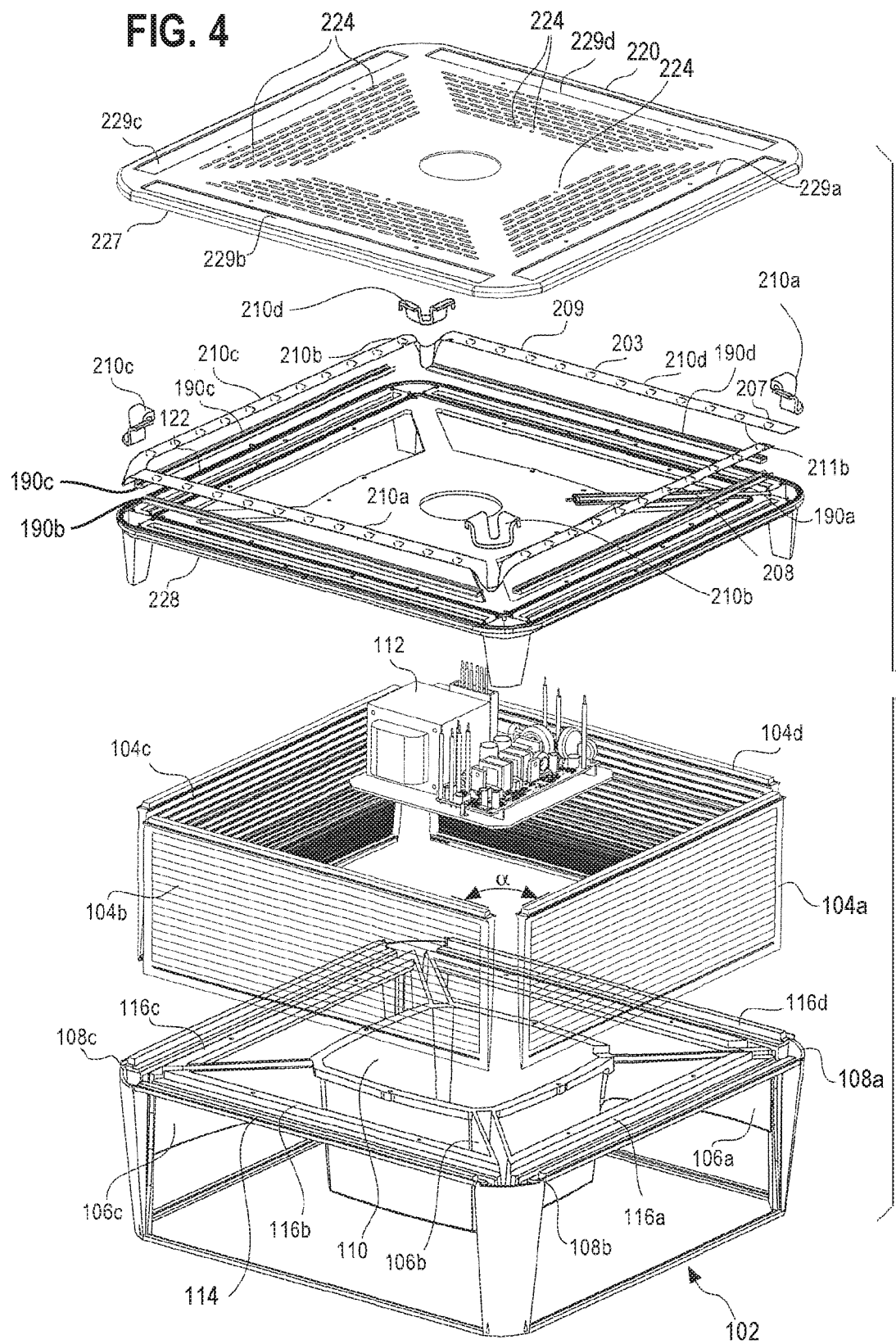

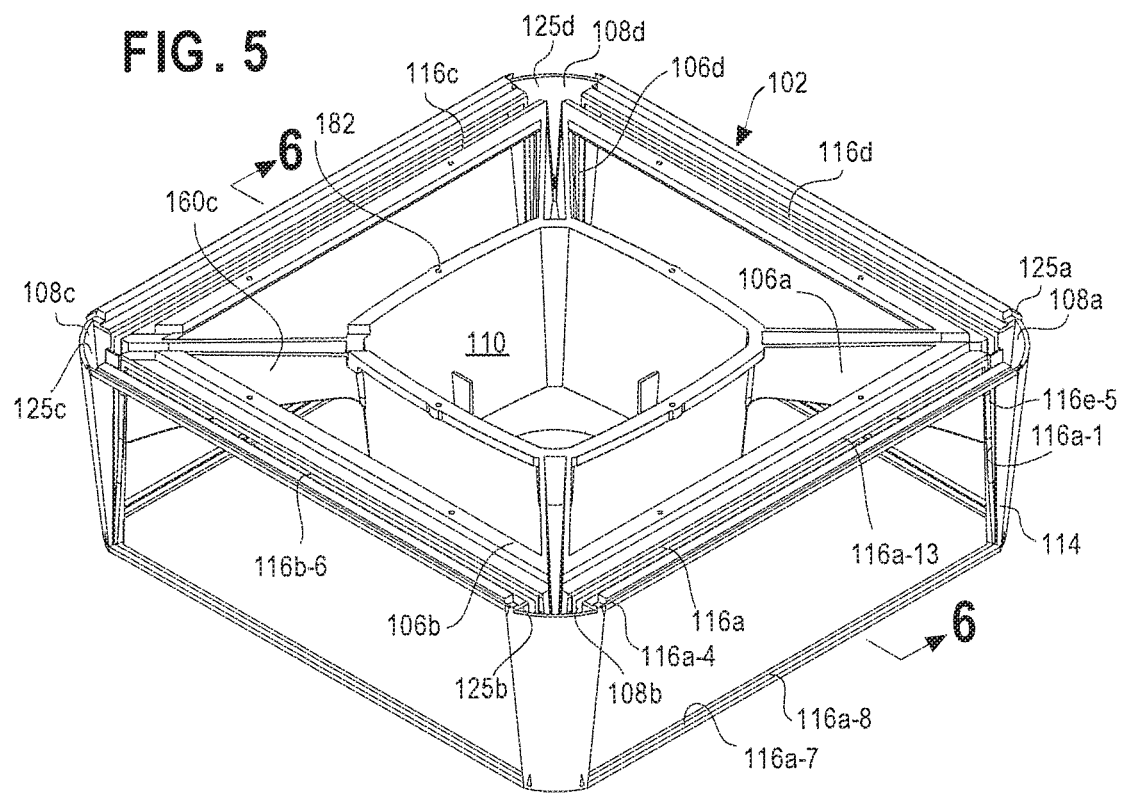
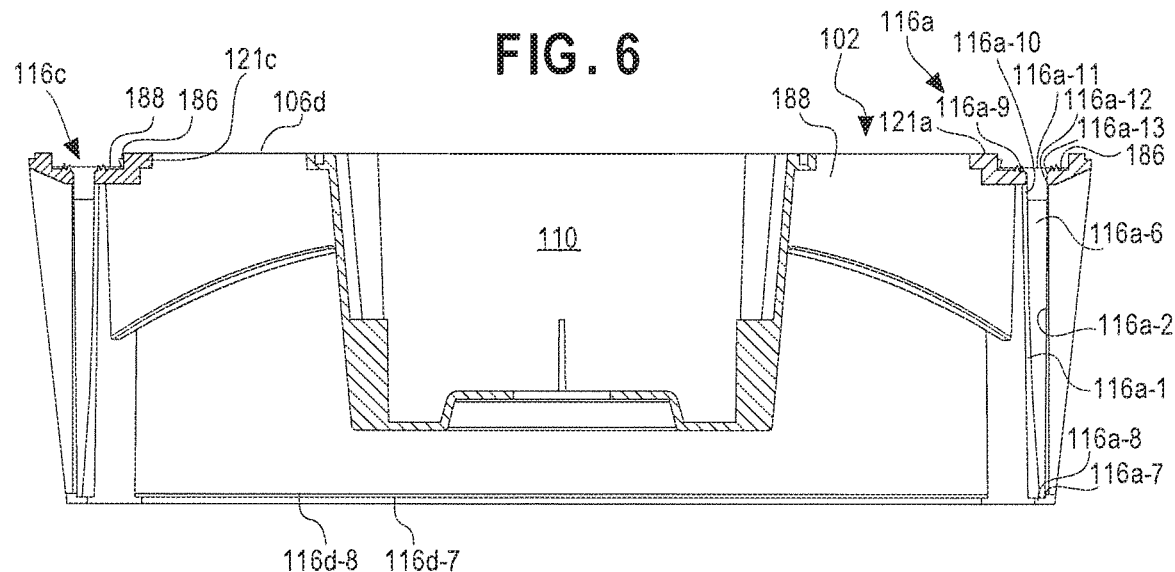

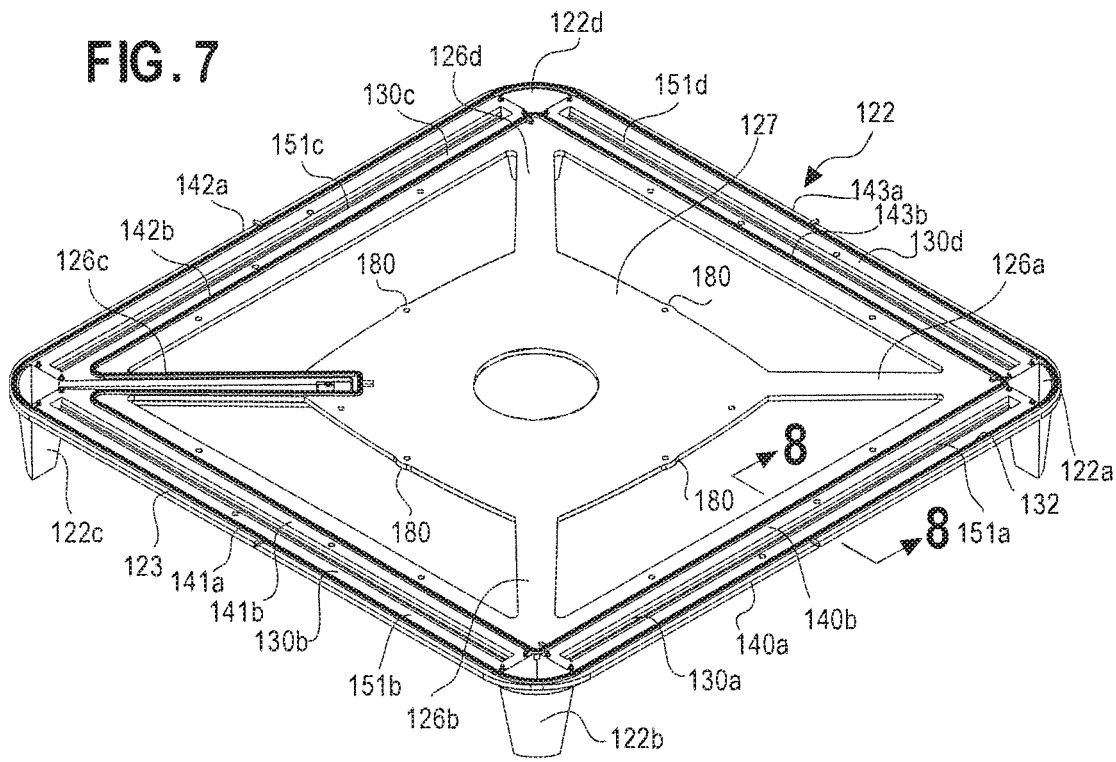
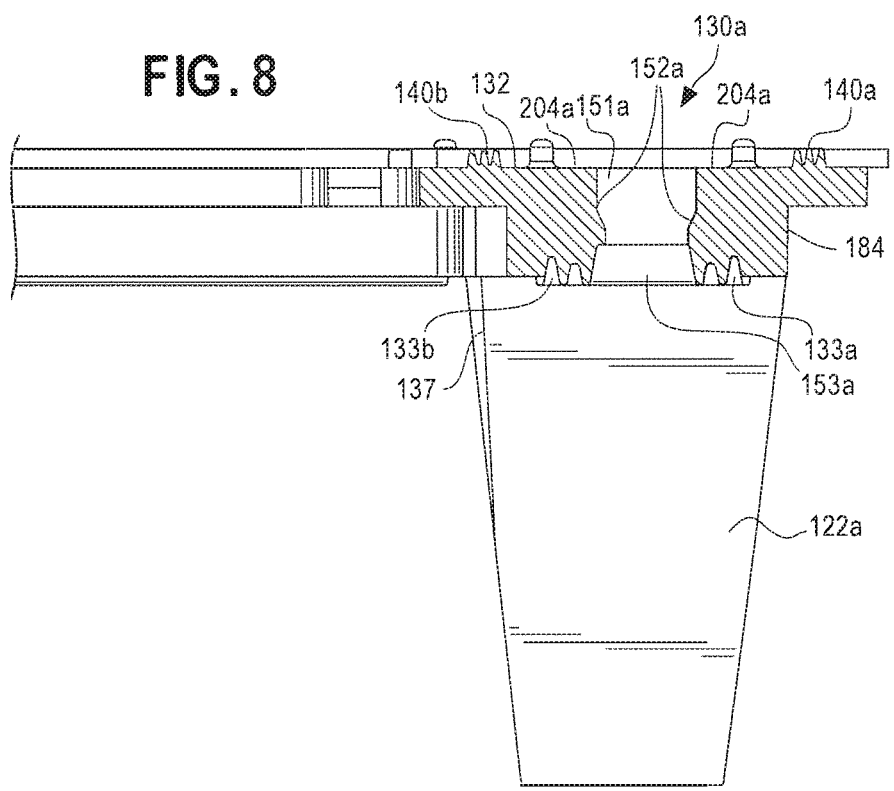

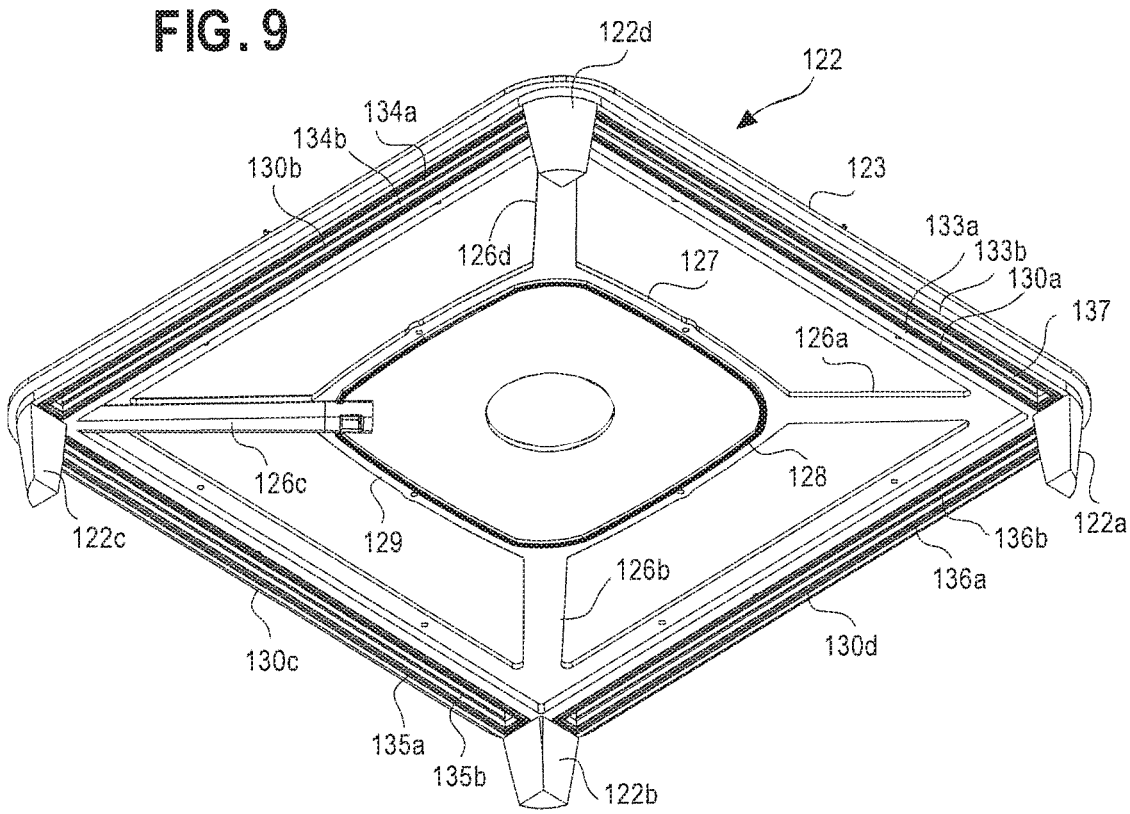

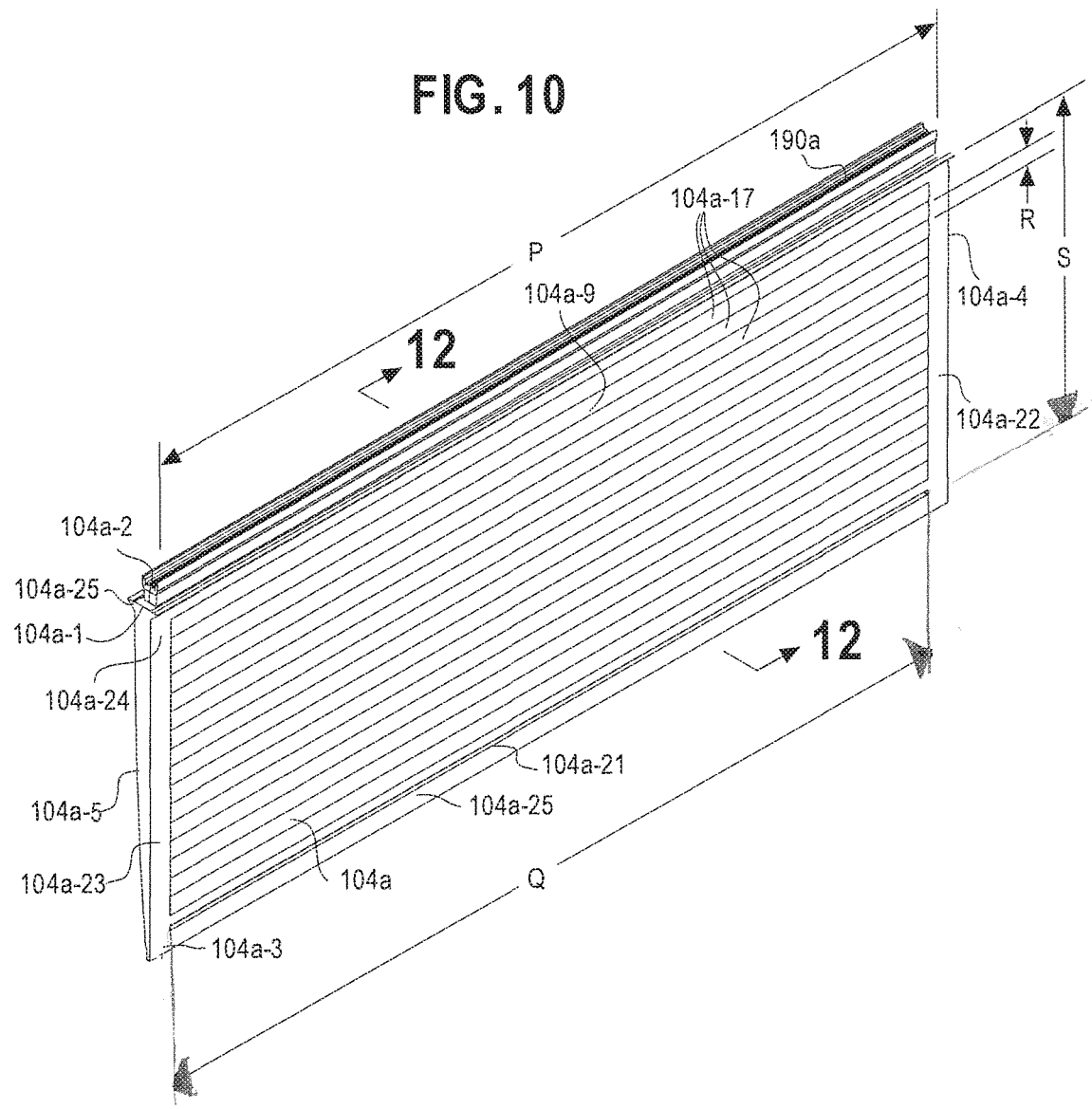

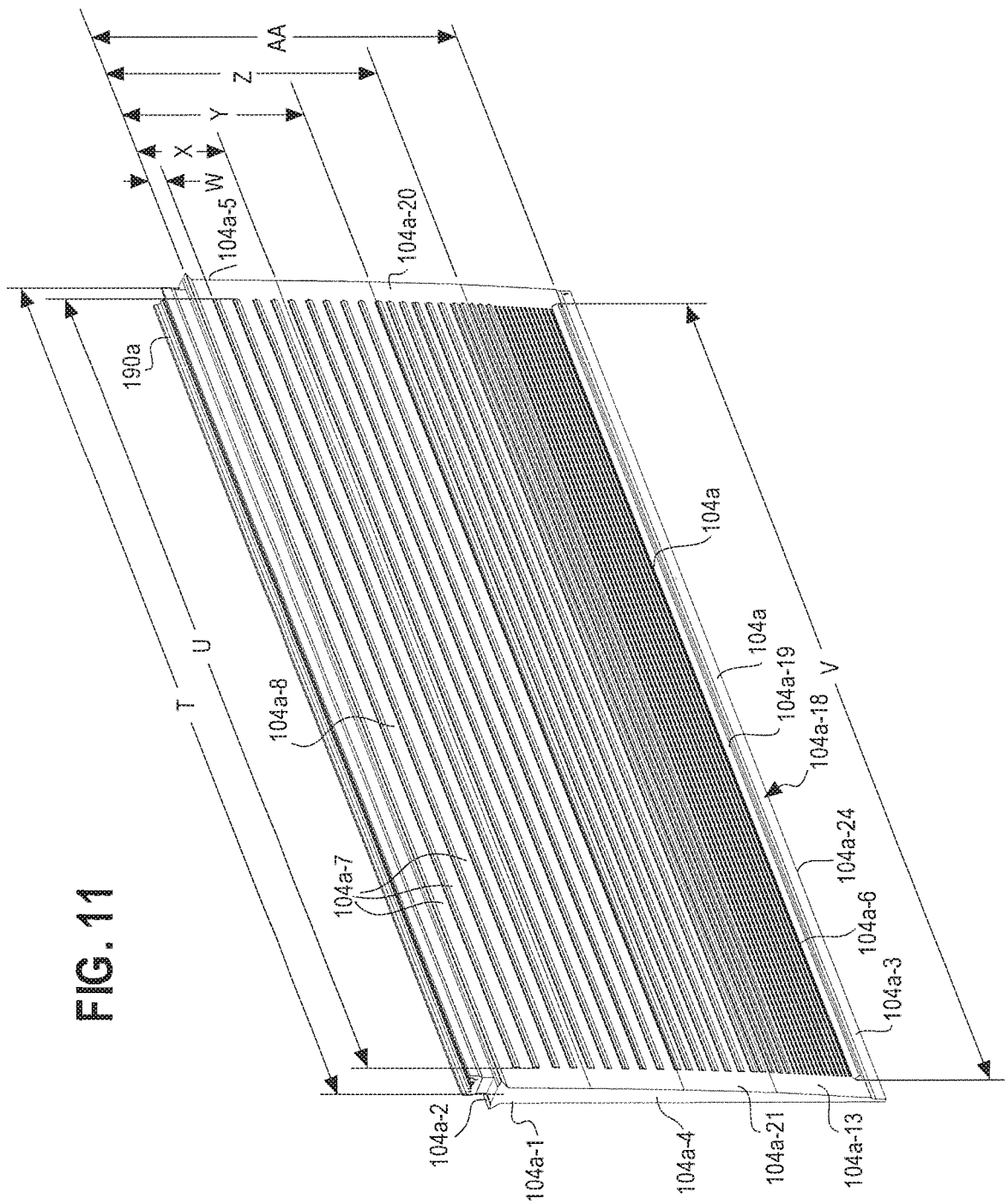

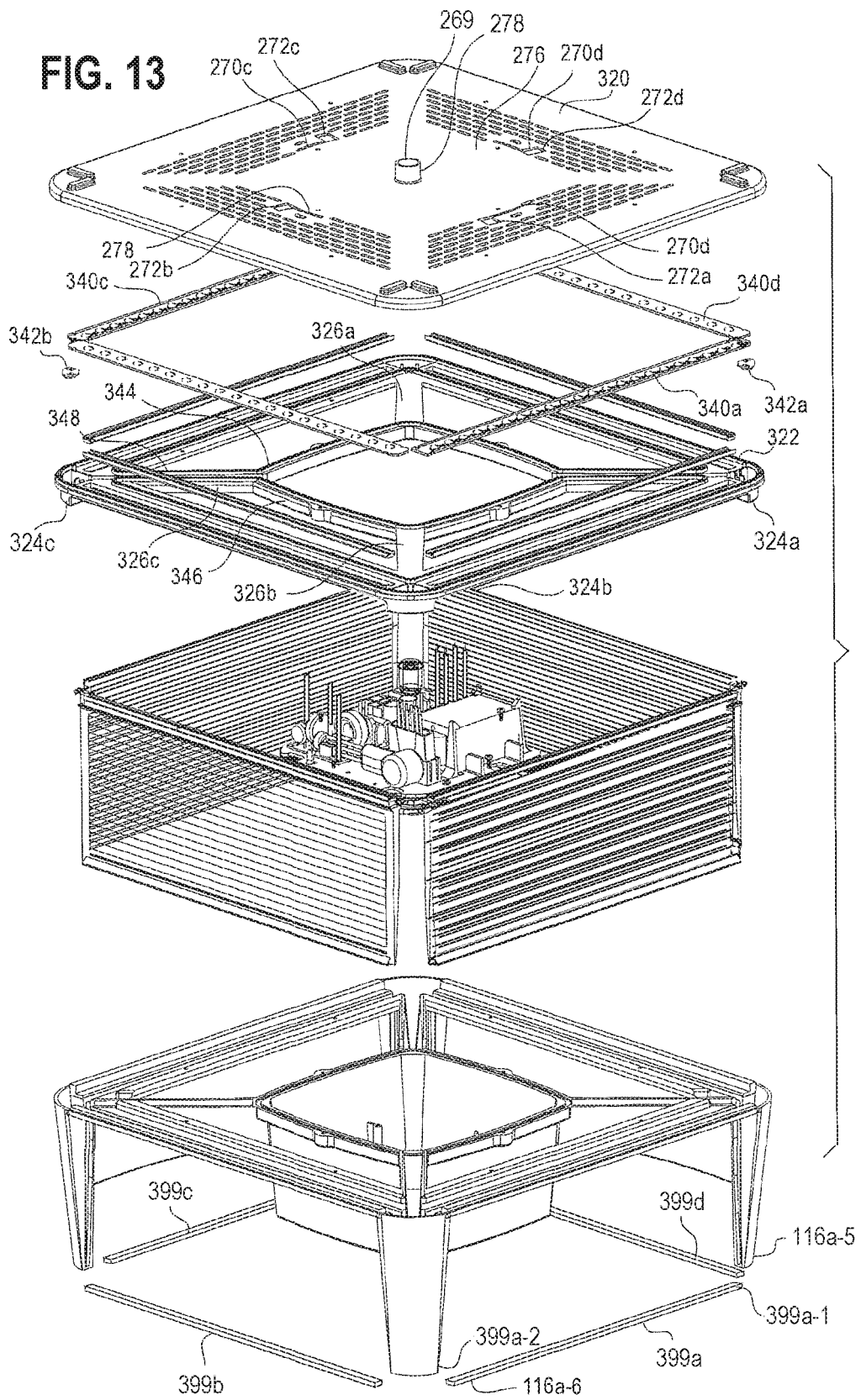

WAVEGUIDE LUMINAIRE WITH SIDE GLARE SHIELD

RELATED APPLICATIONS

This application claims priority to U.S. Provisional Application No. 62/805,618, filed 14 Feb. 2019, the disclosure of which is incorporated by reference herein in its entirety.

BACKGROUND

Large areas of open space, such as a parking lot or deck of a parking garage, require sufficient lighting to allow for safe travel of vehicles and persons through the space at various times including periods of reduced natural lighting such as nighttime, rainy, or foggy weather conditions. A luminaire for an outdoor parking lot or covered parking deck should illuminate a large area of space in the vicinity of the luminaire while controlling glare so as not to distract drivers. Still further, such a luminaire should be universal in the sense that the luminaire can be mounted in various enclosed and non-enclosed locations, on poles or on a surface (such as a garage ceiling), and preferably present a uniform appearance.

Furthermore, the luminaire used to illuminate a parking lot or structure should be of sturdy construction to withstand wind and other forces and to resist weathering yet be light enough to allow for ease of installation. Additionally, such a luminaire should be aesthetically pleasing.

Advances in light emitting diode (LED) technology have resulted in wide adoption of luminaires that incorporate such devices. While LEDs can be used alone to produce light without the need for supplementary optical devices, it has been found that optical modifiers, such as lenses, reflectors, optical waveguides, and combinations thereof, can significantly improve illumination distribution for particular applications.

Despite these advances, there may be particular applications in which it is not desirable for a lighting solution to emit light in one or more directions. For example, lighting used to illuminate an outside parking lot should not shine into the nearby houses or apartments.

SUMMARY

One aspect is directed to a luminaire that includes a frame and a plurality of optical waveguides disposed in the frame and positioned at different angles relative to one another to direct light outward in multiple different directions. Each optical waveguide includes first and second opposite waveguide ends, a coupling portion disposed at the first waveguide end, and a light projecting portion disposed between the first and second waveguide ends. The luminaire also includes at least one LED associated with each optical waveguide, and a shield connected to the frame and configured to reduce the light from being directed in one or more of the different directions.

In another aspect, the shield is a light shield mounted at one of the optical waveguides with the light shield including an opaque mask that extends across the optical waveguide.

In another aspect, the light shield includes opposing ears and tabs that are spaced apart and configured to contact against opposing sides of the frame to secure the light shield to the frame and to extend across the optical waveguide.

In another aspect, the shield is a coating on one of the optical waveguides.

In another aspect, the coating is on both an inner side and an outer side of the optical waveguide.

In another aspect, the shield includes a diffuse reflecting surface that faces towards the optical waveguide to reflect light emitted from the at least one LED that is associated with the optical waveguide.

In another aspect, the optical waveguides include four optical waveguides that define a rectangular closed path and the shield is mounted at one of the optical waveguides.

One aspect is directed to a luminaire that includes a frame with a plurality of sides. At least two light-emitting sections are positioned in the frame with each of the light-emitting sections configured to emit light outward from one of the sides of the frame. Each of the light-emitting sections includes one or more LEDs, and an optical waveguide disposed in the frame and configured to receive light from the one or more LEDs and to direct the light outward from one of the sides of the frame, wherein each of the optical waveguides includes first and second opposite waveguide ends, a coupling portion disposed at the first waveguide end, and a light projecting portion disposed between the first and second waveguide ends. The luminaire also includes a blank section positioned in the frame with the blank section configured to emit less light outward from one of the sides of the frame relative to each of the light-emitting sections.

In another aspect, the blank section emits no light.

In another aspect, each of the blank sections includes: an optical waveguide with first and second opposite waveguide ends, a coupling portion disposed at the first waveguide end, and a light projecting portion disposed between the first and second waveguide ends; at least one LED configured to emit light into the coupling portion of the optical waveguide; and a shield that extends over the optical waveguide and obstructs light from being projected out of the light projecting portion of the optical waveguide.

In another aspect, the shield includes a light shield that is attached to the frame and includes an opaque mask that extends across the optical waveguide.

In another aspect, the light shield includes opposing ears and tabs that are spaced apart and configured to contact against opposing sides of the frame to secure the light shield to the frame.

In another aspect, each of the blank sections includes a panel mounted in the frame and configured to prevent light from passing.

In another aspect, the panel and the optical waveguides include a common shape and size and the plurality of LEDs are spaced away from each of the blank sections.

In another aspect, the frame includes a rectangular shape with four sides and the light-emitting sections extend along three of the sides and the blank section extends along one of the sides.

In another aspect, the blank section includes an optical waveguide that includes a coating.

One aspect is directed to a method of reducing light emitted by a luminaire. The method includes: powering a first LED associated with a first light-emitting section on a first side of the luminaire and receiving light from the first LED into a first optical waveguide disposed on the first side and directing the light outward in a first direction through a light projecting portion of the first optical waveguide that is disposed between first and second waveguide ends; powering a second LED associated with a second light-emitting section on a second side of the luminaire and receiving light from the second LED into a second optical waveguide disposed on the second side and directing the light outward in a second direction through a light projecting portion of the second optical waveguide that is disposed between first and second waveguide ends. The method includes shielding the first light-emitting section and reducing the light that is emitted outward from the luminaire in the first direction while continuing to direct the light outward in the second direction from the second light-emitting section.

In another aspect, wherein adjusting an operational configuration of one of the optical waveguides includes installing a shield over the light projecting portion of the optical waveguide.

In another aspect, installing the shield over the light projecting portion of the optical waveguide includes applying a coating to the light projecting portion.

In another aspect, installing the shield over the light projecting portion of the optical waveguide includes positioning a light shield comprising an opaque mask area over the light projecting portion.

BRIEF DESCRIPTION OF THE DRAWINGS

FIG. 4 is an exploded view of the embodiment of FIGS. 1 and 2.

FIG. 5 is an isometric view of the main frame of FIGS. 1 and 2.

FIG. 6 is a sectional view of the main frame taken generally along the lines 6-6 of FIG. 5.

FIG. 7 is an isometric view from above of the auxiliary frame of FIGS. 1 and 2.

FIG. 8 is a sectional view taken generally along the lines 8-8 of FIG. 7.

FIG. 9 is an isometric view from below of the auxiliary frame of FIG. 7.

FIG. 10 is an isometric front view of one of the optical waveguides and coupling members of the luminaire of FIGS. 1 and 2.

FIG. 11 is an isometric rear view of one of the optical waveguides and coupling members of the luminaire of FIGS. 1 and 2.

FIG. 13 is exploded view of an alternative embodiment of a luminaire.

DETAILED DESCRIPTION

Figure 1:
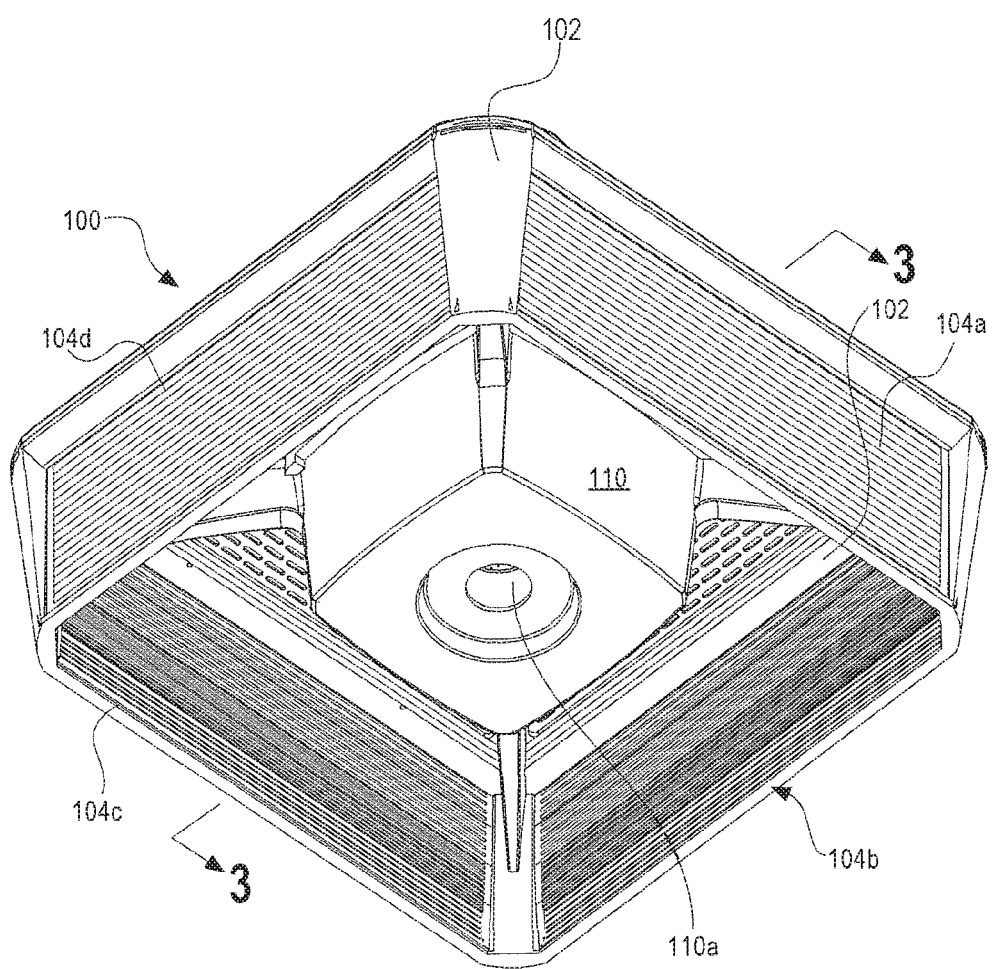
FIG. 1 is an isometric view from below of an embodiment of a luminaire with an illumination sensor omitted therefrom.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying enumerated embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIGS. 1-4 disclose a luminaire 100 for general lighting, more particularly, for illumination of an open space and, specifically, a parking lot or parking deck of a garage. The luminaire 100 comprises a housing 102 that includes support structures (discussed hereinafter) by which the luminaire 100 can be supported. A first plurality of optical waveguides 104a-104d is disposed on and supported by the housing 102. A second plurality of light emitting diode elements or modules (LED's) 105 is supported by the housing 102 as noted in greater detail hereinafter.

Each LED element or module 105 (FIGS. 3 and 4) may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination with improved color rendering is to be produced, each LED element or module 105 or a plurality of such elements or modules may include one or more blue shifted yellow LEDs and one or more red LEDs. The LEDs 105 may be disposed in different configurations and/or layouts as desired. Different color temperatures and appearances could be produced using other LED combinations, as is known in the art. In one embodiment, the light source comprises any LED, for example, an MT-G LED incorporating TrueWhite® LED technology or as disclosed in U.S. Pat. No. 9,818,919, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is incorporated by reference herein, may be utilized. In some embodiments, each LED element or module 105 may comprise one or more LEDs disposed within a coupling cavity with an air gap being disposed between the LED element or module 105 and a light input surface. In any of the embodiments disclosed herein each of the LED element(s) or module(s) 105 preferably have a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED element(s) or module(s) may be used as the light source.

Each waveguide 104 may have any suitable shape, and the shapes of the waveguides 104 may be different from one another or substantially identical. For example, a first subset less than all of the waveguides 104 may be substantially identical to one another, and some or all of the remaining waveguides 104 comprising a second subset may be different than the waveguides of the first subset. In this latter case, the waveguides of the second subset may be substantially identical to each other or some or all may be different from one another. Any combination of substantially identical and/or different waveguides 104 that develop identical or different light illumination distributions is contemplated. Also, although four waveguides 104 are illustrated in the Figures, a different number of waveguides could be used, as noted in greater detail hereinafter. In some embodiments, two or more waveguides may be disposed at an angle α (FIG. 4) relative to one another. In one such embodiment, the angle α may be approximately 90 degrees. In another embodiment, the angle α may be greater or less than 90 degrees to produce a desired distribution. Still further, the material(s) of the waveguides 104 preferably comprise optical grade materials that exhibit TIR characteristics including, but not limited to, one or more of acrylic, air, polycarbonate, molded silicone, glass, and/or cyclic olefin copolymers, and combinations thereof, possibly in a layered arrangement, to achieve a desired effect and/or appearance. Preferably, although not necessarily, the waveguides 104 are all solid or some or all have one or more voids or discrete bodies of differing materials therein. The waveguides 104 may be fabricated using procedures such as hot embossing or molding, including injection/compression molding. Other manufacturing methods may be used as desired.

Figure 18:
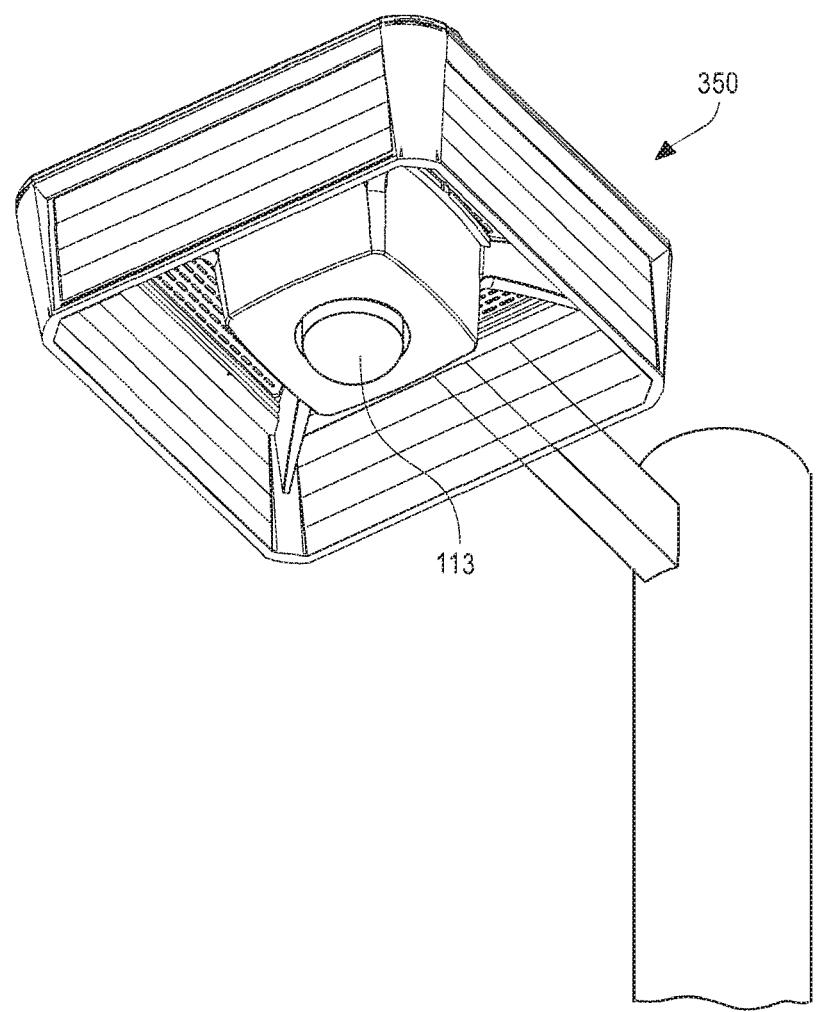
Figure 19:
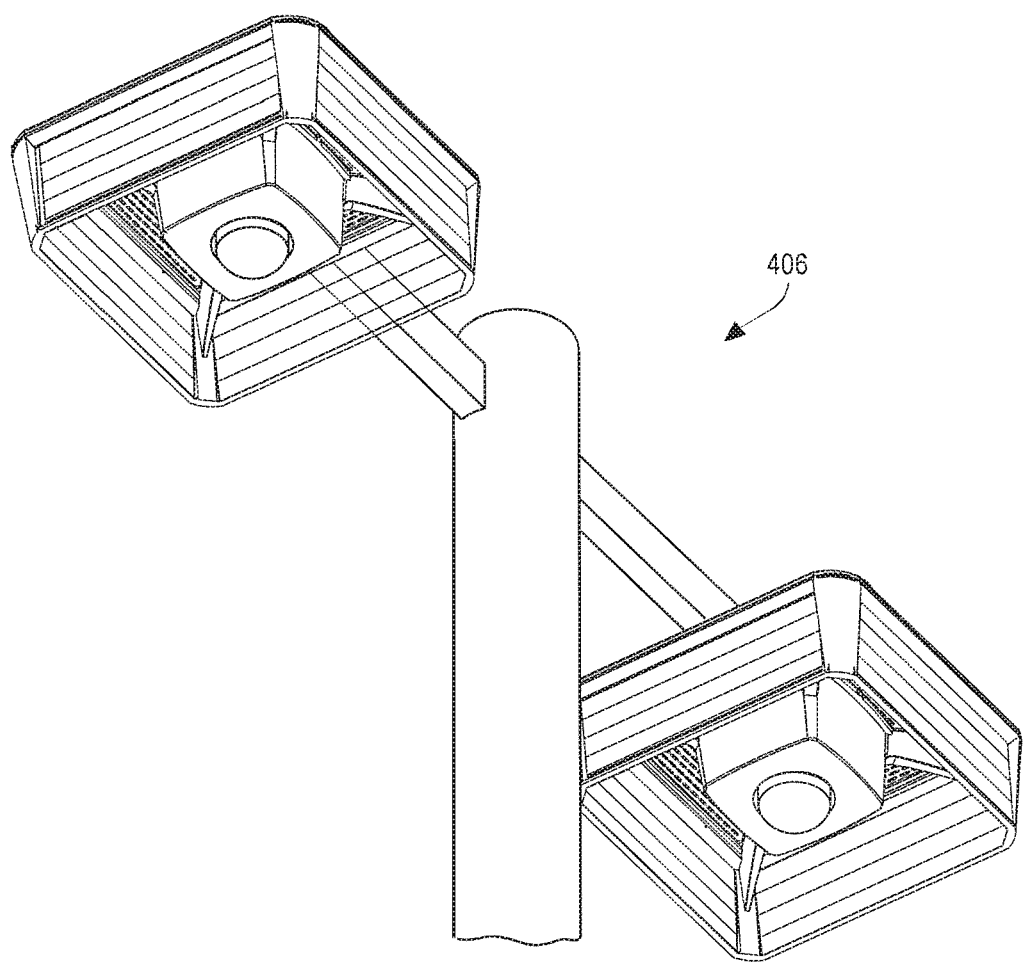
FIGS. 19-21 are bottom isometric views of embodiments of multiple post mounted luminaires.
Figure 20:
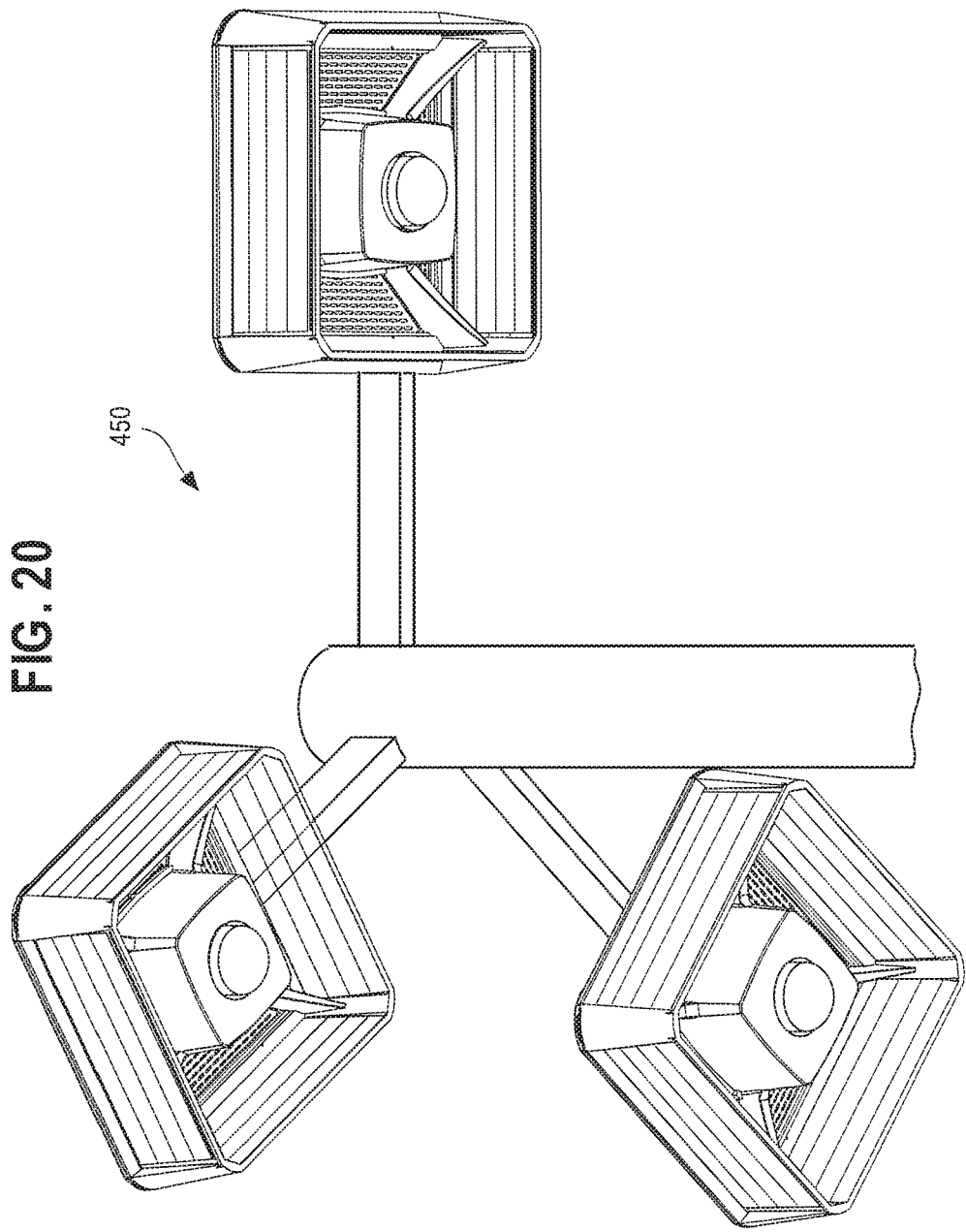
Figure 21:
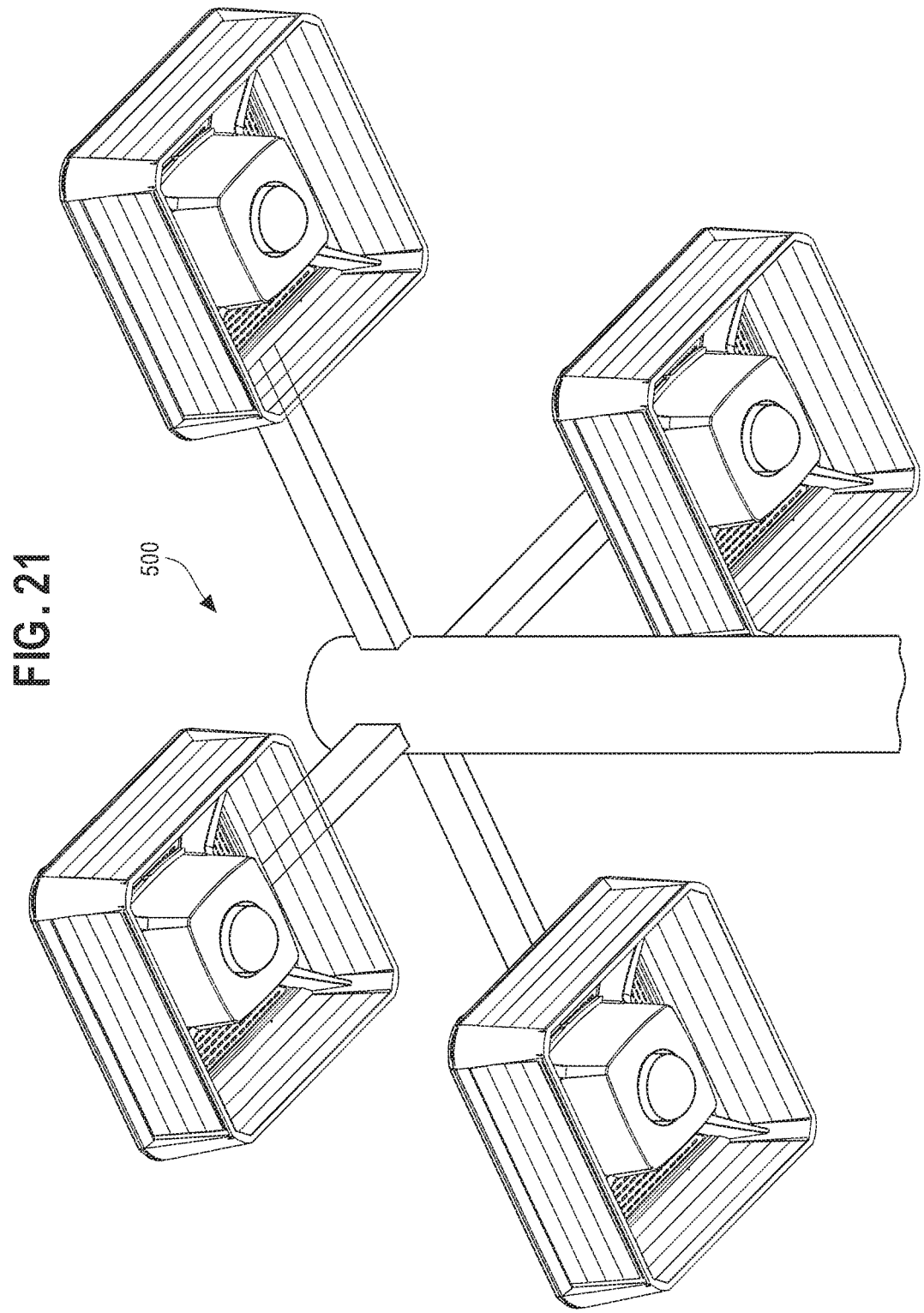

Referring also to FIGS. 5-9, the housing 102 has at least one, and, more preferably, four support brackets 106a-106d that extend diagonally between opposite corners 108a, 108c and 108b, 108d. The support brackets 106 support an open central enclosure 110. Operating circuitry 112 is disposed and retained in the central enclosure 110. Any of the embodiments disclosed herein may include operating circuitry 112 comprising a power circuit having a buck regulator, a boost regulator, a buck-boost regulator, a SEPIC power supply, or the like, and may comprise a driver circuit as disclosed in U.S. Pat. No. 9,791,110, filed May 30, 2014, entitled "High Efficiency Driver Circuit with Fast Response" by Hu et al. or U.S. Pat. No. 9,303,823, filed May 30, 2014, entitled "SEPIC Driver Circuit with Low Input Current Ripple" by Hu et al. the disclosures of which are hereby incorporated by reference. An infrared or other sensor 113 (FIG. 18) may be supported in a lower opening 110a (FIG. 1) of the enclosure 110 and may comprise a part of the operating circuitry 112. The sensor 113 may be provided to cause the balance of the operating circuitry to energize or vary the illumination level of the luminaire 100 in accordance with sensed ambient light levels.

Figure 11A:
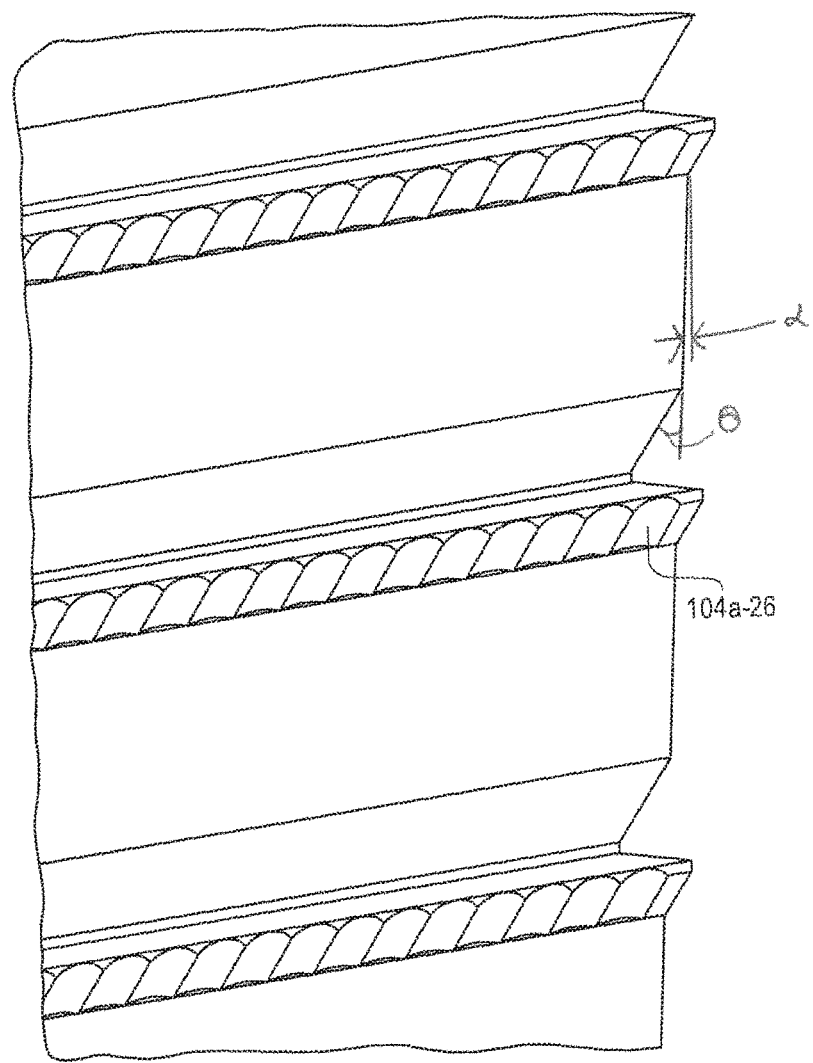
FIG. 11A is an enlarged, fragmentary view of the optical waveguide of FIG. 11.
Figure 12:
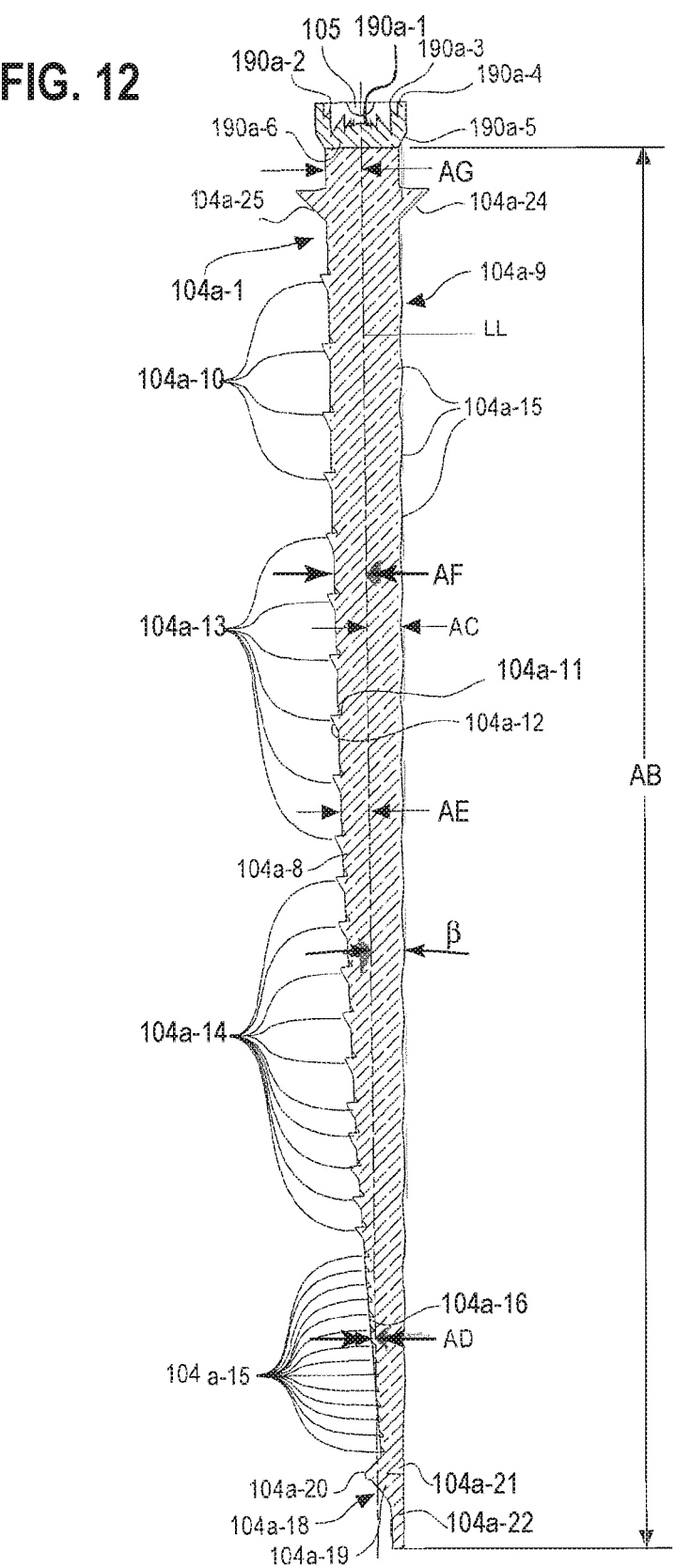
FIG. 12 is a sectional view taken generally along the lines 12-12 of FIG. 10.

In the illustrated embodiment, the housing 102 comprises a main frame 114 having channeled receptacles 116a-116d that receive the waveguides 104a-104d, respectively. Preferably, although not necessarily, the waveguides 104a-104d are all substantially, if not entirely, identical to one another, as are the channeled receptacles 116, and hence, only the waveguide 104a and receptacle 116a will be described in detail herein. Also preferably, each waveguide 104 is disposed at equal or unequal angles with respect to adjacent waveguides 104 to define a partially or entirely closed path so that light is distributed at least partially about the path. As seen in FIG. 10, the waveguide 104a includes an enlarged tapered portion 104a-1 adjacent a first or top end 104a-2. The waveguide 104a further includes a second or bottom end 104a-3 and side edge portions 104a-4 and 104a-5. Referring to FIG. 11, a light emitting portion 104a-6 is disposed between the portion 104a-1 and end 104a-3. The light emitting portion 104a-6 includes a plurality of light extraction features 104a-7 disposed on or in a first or rear surface 104a-8 opposite a second or front surface 104a-9. It should be noted that the light extraction features 104a-7 may be irregularly spaced or some may be regularly spaced and others irregularly spaced, etc. In the illustrated embodiment, the plurality of light extraction features 104a-7 includes a first set of features 104a-10 (FIG. 12) that are relatively large and widely spaced and disposed at an upper portion of the waveguide 104a relatively nearer the tapered portion 104a-1. Each of the extraction features 104a-10 may be generally of the shape disclosed in International Application Serial No. PCT/US2014/013937, filed Jan. 30, 2014, entitled "Optical Waveguide Bodies and Luminaires Utilizing Same", owned by the assignee of the present application and the disclosure of which is incorporated by reference herein. As seen in FIG. 12, each feature 104a-10 comprises an elongate wedge-shaped channel or groove 104a-11 disposed adjacent an elongate wedge-shaped ridge or protrusion 104a-12, both of which preferably extend partially between the side edge portions 104a-4 and 104a-5 transversely (preferably, although not necessarily, perpendicularly) with respect thereto. The wedge-shaped channel 104a-11 includes an extraction surface 104a-11a formed at an angle θ (FIG. 11A) relative to the rear surface 104a-8. The angle θ may be constant, vary throughout the length of the extraction feature 104a-10, vary throughout the group of extraction features 104a-10, and/or vary throughout the groups of extraction features 104a-10, 104a-13, 104a-14, and/or 104a-15 described below. In some embodiments, the angle varies between about 25° and about 40°. Also preferably, although not necessarily, the channels and ridges of each feature 104a-10 are parallel to each other and to other channels and ridges of other features 104a-10.

The features 104a-7 further include three further groups of features 104a-13, 104a-14, and 104a-15 that progressively become smaller in size and more closely spaced together with distance from the upper end of the waveguide 104a. The features 104a-10, 104a-13, 104a-14, and 104a-15 define four segments with differing inter-feature angles α (FIG. 11A) that further improve light intensity uniformity and the latter three groups 104a-13 through 104a-15 are disposed nearer the second end 104a-3 of the waveguide 104a than the group 104a-10. The back surface 104a-8 between each extraction feature 104a-7 defines an inter-feature angle γ relative to a line parallel to a line LL normal to an edge 104a-27 at the first end 104a-2 of the waveguide 104. In some embodiments, the inter-feature angle γ may range between about 0.5° and about 5°. In one example embodiment, the inter-feature angles γ of groups 104a-10, 104a-13, 104a-14, and 104a-15 may be 1°, 2°, 3°, and 4°, respectively. Similar to group 104a-10, each feature of the groups 104a-13 and 104a-14 include an elongate wedge-shaped channel or group similar to channel 104a-11 disposed adjacent an elongate wedge-shaped ridge or protrusion similar to ridge 104a-12, both of which preferably extend partially between the side edge portions 104a-4 and 104a-5 transversely (preferably, although not necessarily, perpendicularly) with respect thereto. Also preferably, although not necessarily, the channels and ridges of each feature 104a-13 and 104a-14 are parallel to each other and to other channels and ridges of other features 104a-10, 104a-13, and 104a-15. Group 104a-15 includes wedge-shaped channels 104a-16 seen in FIG. 12, that preferably extend partially between the side edge portions 104a-4 and 104a-5 transversely (preferably, although not necessarily, perpendicularly) with respect thereto. Further, the channels 104a-16 are preferably, although not necessarily, parallel to one another and parallel to the channels and ridges of each feature 104a-10. The features 104a-7 recycle at least some of the light that would otherwise escape out the rear surface 104a-8 of the waveguide 104a back into the waveguide 104a. The features 104a-7 are disposed at varying pitches (i.e., spacings), and/or have varying sizes, and define differing inter-feature angle γ segments so that light of substantially uniform intensity is emitted out the front surface 104a-9.

Figure 12A:
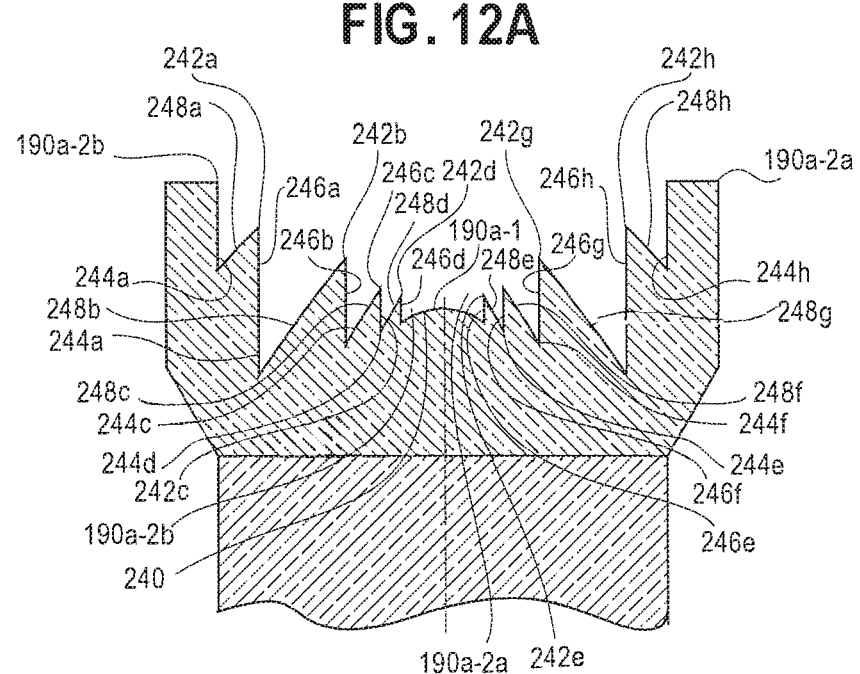
FIGS. 12A and 12B are enlarged, fragmentary views of the coupling member of FIG. 10.
Figure 12B:
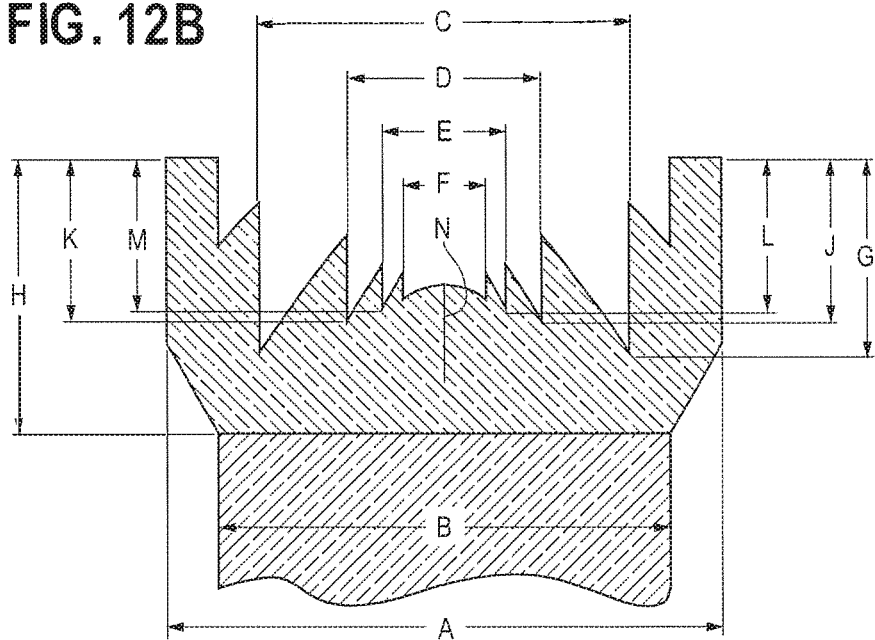
Figure 12C:
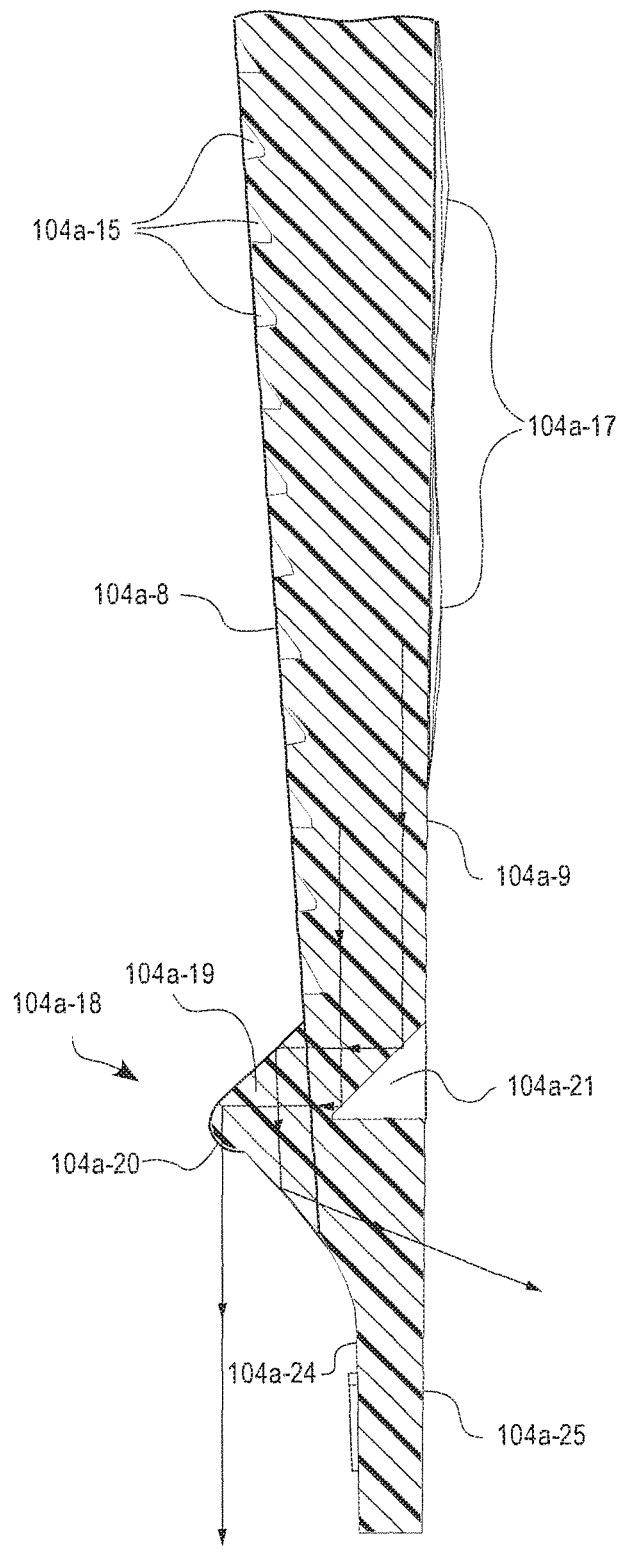
FIG. 12C is an enlarged, fragmentary sectional view of the optical waveguide of FIG. 10.

Referring to FIGS. 12 and 12C, the waveguide 104a further includes scalloped features 104a-17 disposed on or in the front surface 104a-9 and an end light extraction feature 104a-18 disposed adjacent the bottom end 104a-3. The end light extraction feature 104a-18 includes an elongate wedge-shaped protrusion 104a-19 disposed in or on the rear surface 104a-8 wherein the protrusion 104a-19 includes a downwardly directed rounded crest portion 104a-20. The end light extraction feature 104a-18 further includes an elongate wedge-shaped channel 104a-21 disposed on or in the front surface 104a-9. Preferably, the scalloped features 104a-17 and the wedge-shaped channel 104a-21 are parallel to the wedge-shaped protrusion 104a-19 and at least a portion of the channel 104a-21 is disposed within the top-to-bottom extent of the protrusion 104a-19. Still further, the scalloped features 104a-17, the protrusion 104a-19, and the channel 104a-21 preferably extend transversely (and, more preferably perpendicular) with respect to but do not extend fully between the side edge portions 104a-4 and 104a-5 such that side flanges 104a-22 and 104a-23 are defined adjacent the side edge portions 104a-4 and 104a-5, respectively. Further, bottom rear and front surfaces 104a-24, 104a-25 defining a flange extend below the end light extraction feature 104a-18 from the rear and front surfaces 104a-8, 104a-9, respectively. The waveguide 104a may have a slight concave curvature from top to bottom (as seen from the outside of the luminaire 100) to increase light distribution size as compared to a waveguide with no curvature. Additionally, the second or front surface 104a-9 may form an angle β relative to a line parallel to the line LL normal to the edge 104a-27 at the first end 104a-2 of the waveguide 104 as shown in FIG. 12. Further, the waveguide 104a is also tapered from top to bottom to maximize the possibility that light traveling through the waveguide 104a exits the waveguide during a single pass therethrough. To that end the end light extraction feature 104a-18 further ensures that light is extracted at the end of a single pass and, as seen in FIG. 12B, the feature 104a-18 causes a portion of the extracted light to be directed downwardly and a portion to be directed out of the front surface 104a-25. This "ray split" feature allows a separate or overmolded bottom frame member (described hereinafter) to be used without optical efficiency losses related to the absorption of light into the bottom frame member.

Pixelization (i.e., the ability to image individual light sources) is minimized by preferably providing a series of curved indentations or protrusions 104a-26 (otherwise referred to as "fish-scale" features) disposed in a linear array above or below some or all of the light extraction features 104a-7, as seen in FIG. 11A.

The channeled receptacle 116a includes spaced side walls 116a-1, 116a-2 and 116a-3, 116a-4 defining opposed side channels 116a-5 and 116a-6, an upstanding bottom wall 116a-7 in part defining a bottom frame member, a base surface 116a-8, and surfaces 116a-9 through 116a-12 together defining a tapered top opening 116a-13 extending through a corresponding side member 121a of the main frame 114. During assembly, the bottom end 104a-3 of the waveguide 104a is inserted into the tapered top opening 116a-13 of the channeled receptacle 116a such that the side flanges 104a-22 and 104a-23 enter the opposed side channels 116a-5 and 116a-6, respectively. The waveguide 104a is further inserted into the channeled receptacle 116a until tapered lower surfaces 104a-24 and 104a-25 of the enlarged tapered portion 104a-1 are seated against tapered shoulder surfaces 116a-10 and 116a-11 of the surfaces 116a-9 and 116a-12 defining the tapered top opening 116a-13. At this time, the bottom end 104a-3 is disposed adjacent the upstanding bottom wall 116a-7 and, preferably, although not necessarily, the bottom end 104-3 contacts the base surface 116a-8.

The remaining waveguides 104b, 104c, and 104d include corresponding elements 104b-1 through 104b-25, 104c-1 through 104c-25, and 104d-1 through 104d-25, respectively, that are substantially similar or identical to the elements 104a-1 through 104a-25. The channeled receptacles 116b, 116c, and 116d include corresponding elements 116b-1 through 116b-13, 116c-1 through 116c-13, and 116d-1 through 116d-13, respectively, that are substantially similar or identical to the elements 116a-1 through 116a-13 and that receive the waveguides 104b, 104c, and 104d, respectively, in the same manner that the waveguide 104a is received in the channeled receptacle 116a.

In the illustrated embodiment, the waveguides 104a-104d are all disposed at the same, or substantially the same, elevation in the luminaire 100, although this need not be the case.

As illustrated in FIGS. 7 and 8, an auxiliary frame 122 is disposed on and secured to the main frame 114 after the waveguides 104 and circuitry 112 are placed into the receptacles 116 and the central enclosure 110, respectively. The auxiliary frame 122 includes an outer peripheral portion 123 having four nesting portions 122a-122d that are disposed in corner recesses 125a-125d of the main frame 114. Outer surfaces of the nesting portions 122 and inner surfaces of the corner recesses 125 are preferably, although not necessarily, complementarily shaped. The auxiliary frame 122 further includes inwardly diagonally directed arms 126a-126d that support a central cover portion 127. When the auxiliary frame 122 is disposed on the main frame 114 such that the nesting portions 122 extend into the corner recesses 125, the central cover portion 127 covers and encloses the central enclosure 110 and the operating circuitry 112 disposed therein. Sealing surface(s) forming a gasket 128 provides a seal between the cover portion 127 and the enclosure 110. The central cover portion 127 includes an opening 129 that allows access to the operating circuitry 112 so that utility electrical power may be connected to power supply wires as noted in greater detail hereinafter.

Referring to FIGS. 7-9, the outer peripheral portion 123 of the auxiliary frame 122 includes a plurality of channels 130a-130d that are aligned with the top ends 104a-1-104d-1 of the waveguides 104a-104d, respectively. The channels 130a-130d are substantially or completely identical and longitudinally extend partially or substantially fully between adjacent corner recesses 125. Each channel 130 extends from a first or upper face 132 and fully through the auxiliary frame 122. Lower seal members 133a, 133b, 134a, 134b, 135a, 135b, and 136a, 136b that may be integral with or separate from the auxiliary frame 122 surround each channel 130a-130d, respectively, at a second or lower face 137. Upper seal members 140a, 140b, 141a, 141b, 142a, 142b, and 143a, 143b that may be integral with or separate from the auxiliary frame 122 are disposed on either side of the channels 130a-130d at the upper face 132. Each channel 130a-130d includes an upper portion 151a-151d having a tapered portion 152a-152d, respectively, and a lower portion 153a-153d that receives a planar top end 104a-2, 104b-2, 104c-2, and 104d-2, of an associated waveguide 104a, 104b, 104c, and 104d, respectively.

Figure 3:
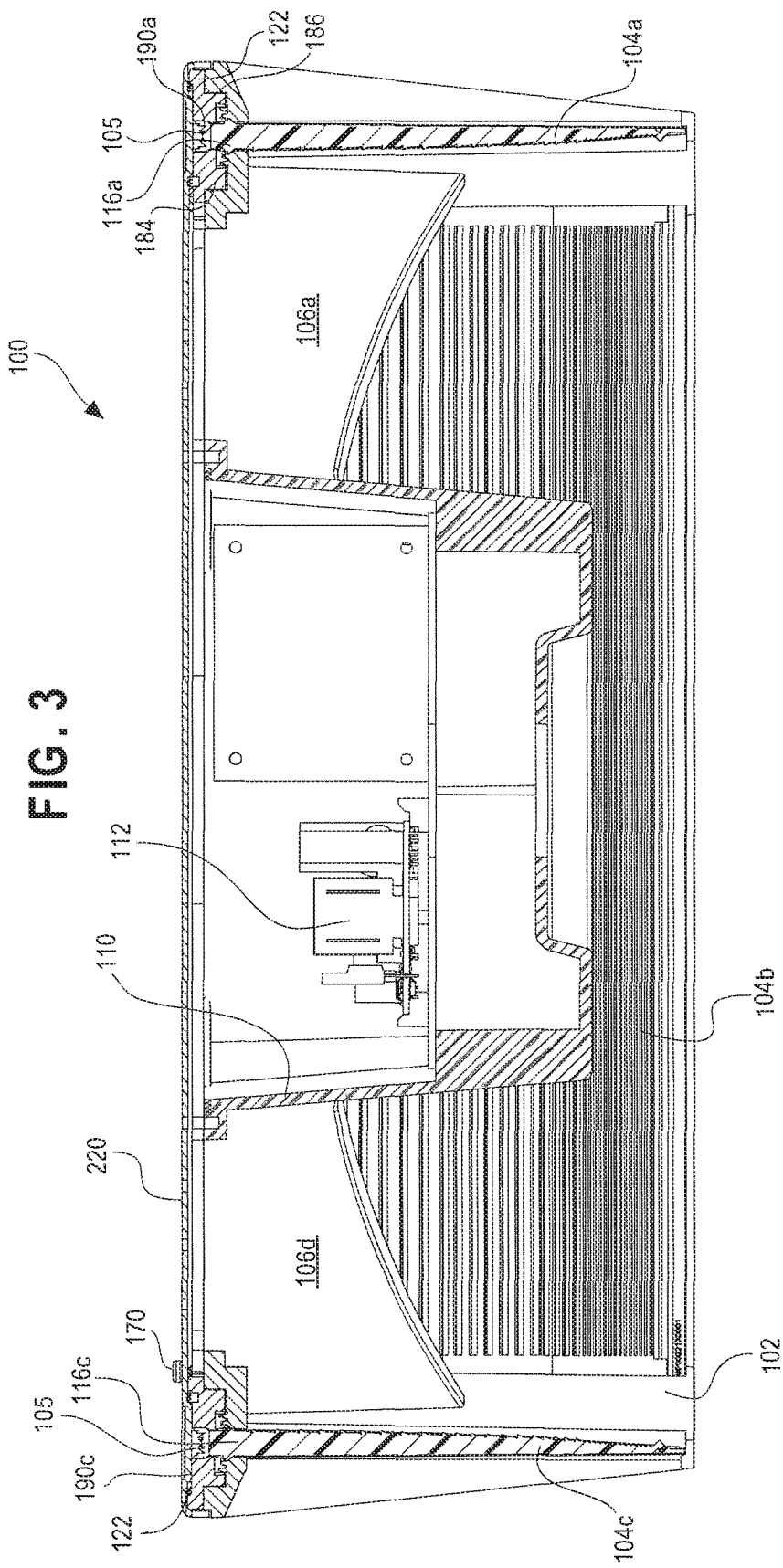
FIG. 3 is a sectional view taken generally along the lines 3-3 of FIG. 1.

As seen in FIGS. 3 and 4, the auxiliary frame 122 is secured to the main frame 114 by fasteners, such as screws 170, that extend through bores 180 in the auxiliary frame 122 into aligned threaded bores 182 in the main frame 114. A downwardly extending shouldered seal section 184 that carries the lower seal members 133a, 133b, 134a, 134b, 135c, 135c, and 136a, 136b extends into a complementarily-shaped channel 186 in the main frame such that the seal members 133a, 133b, 134a, 134b, 135c, 135c, and 136a, 136b bear and seal against the enlarged tapered portions 104a-1, 104b-1, 104c-1, and 104d-1. Further, the seal members 133a, 133b, 134a, 134b, 135c, 135c, and 136a, 136b bear and seal against a base surface 188 of the channel 186. Elongate optical components in the form of optical coupling members 190a-190d are thereafter inserted into the upper portions 151a-151d of the channels 130a-130d, respectively, into contact with the planar top ends 104a-2, 104b-2, 104c-2, and 104d-2. Referring to FIG. 4, the optical coupling members 190 are all preferably (although not necessarily) made of the same suitable optical material, such as liquid silicone rubber, and are preferably (although not necessarily) substantially or completely identical to one another. Accordingly, only the optical coupling member 190a will be described in detail. As seen in FIG. 12, the optical coupling member 190a includes at least one refractive portion 190a-1 and at least one, and preferably, a plurality of reflective portions 190a-2 wherein the refractive portion(s) 190a-1 and reflective portion(s) 190a-2 are both disposed at an upper end 190a-3. The optical coupling member 190a is preferably elongate in length between first and second ends of the member 190a and has a width transverse to and substantially smaller than the length extending between first and second sides. In other embodiments, the optical coupling member may have any other shape such as circular or rounded. For example, a plurality of rounded coupling members may be disposed adjacent a plurality of LED components. In any event, an increase in the proportion of reflected light to refracted light may result in a desirable decrease in imaging of the light sources (i.e., the ability to see the individual light source(s) from outside of the luminaire 100). Further, the optical coupling member 190a further includes a main body 190a-4 having a tapered outer surface 190a-5 terminating at a planar bottom surface 190a-6. The material of the optical coupling member 190a is preferably somewhat sticky so that the planar bottom surface 190a-6 adheres to and forms an optically transmissive bond with the planar top end 104a-2 of the waveguide 104a. Further, the tapered outer surface 190a-5 preferably, but not necessarily, contacts the tapered portion 152a of the channel 130a when the optical coupling member 190a is fully inserted therein.

Preferably, the remaining optical coupling members 190b, 190c, and 190d include elements 190b-1 through 190b-6, 190c-1 through 190c-6, and 190d-1 through 190d-6 that correspond to the elements 190a-1 through 190a-6, respectively and are disposed within the channels 130b, 130c, and 130d in the same fashion as described above with respect to the placement of the optical coupling member 190a in the channel 130a with respect to the waveguide 104a. At least one, and more preferably more than one, LED elements or modules 105 are mounted on exposed conductive portions 202a-202d of a continuous flexible circuit element in the form of a flexible conductor 203 wherein the conductor 203 is disposed atop and spans respective portions 204a-204d of the upper face 132 adjacent and on either sides of the channels 130a-130d, respectively, of the auxiliary member 122 and wherein the LED elements or modules 105 emit light toward the optical conducting members 190. The flexible circuit element may include one or more layers of aluminum and/or copper.

As seen in FIG. 4, in one embodiment, the flexible conductor 203 includes first and second ends 207, 208, respectively, and an intermediate portion 209 comprising sections 210a, 210b, 210c, and 210d separated by corner loops 211a, 211b, and 211c. In the illustrated embodiment, the intermediate portion 209 extends fully about the luminaire 100 such that the sections 210a-210d overlie the channels 130. Also, each of the four nesting portions 124a-124d is preferably hollow and the corner loops 211a, 211b, and 211c are placed into the nesting portions 124a, 124b, and 124c, respectively, and the ends 207, 208 are disposed adjacent the nesting portion 124d. Corner clips 210a-210c are inserted into the nesting portions 124a-124c, respectively, and retained therein, such as by an interference or press fit, so that the loops 211a-211c are retained in the nesting portions 124a-124c and are anchored by the clips 210a-210c. In addition, wires 214 extend through a notch 215 in the walls defining the enclosure 110 and an aperture 216 and a channel 218 formed in the arm 126c of the auxiliary frame 122 between the central enclosure 110 and the nesting portion 124c where electrical connections are made to the flexible conductor 203 in any suitable fashion.

Figure 2:
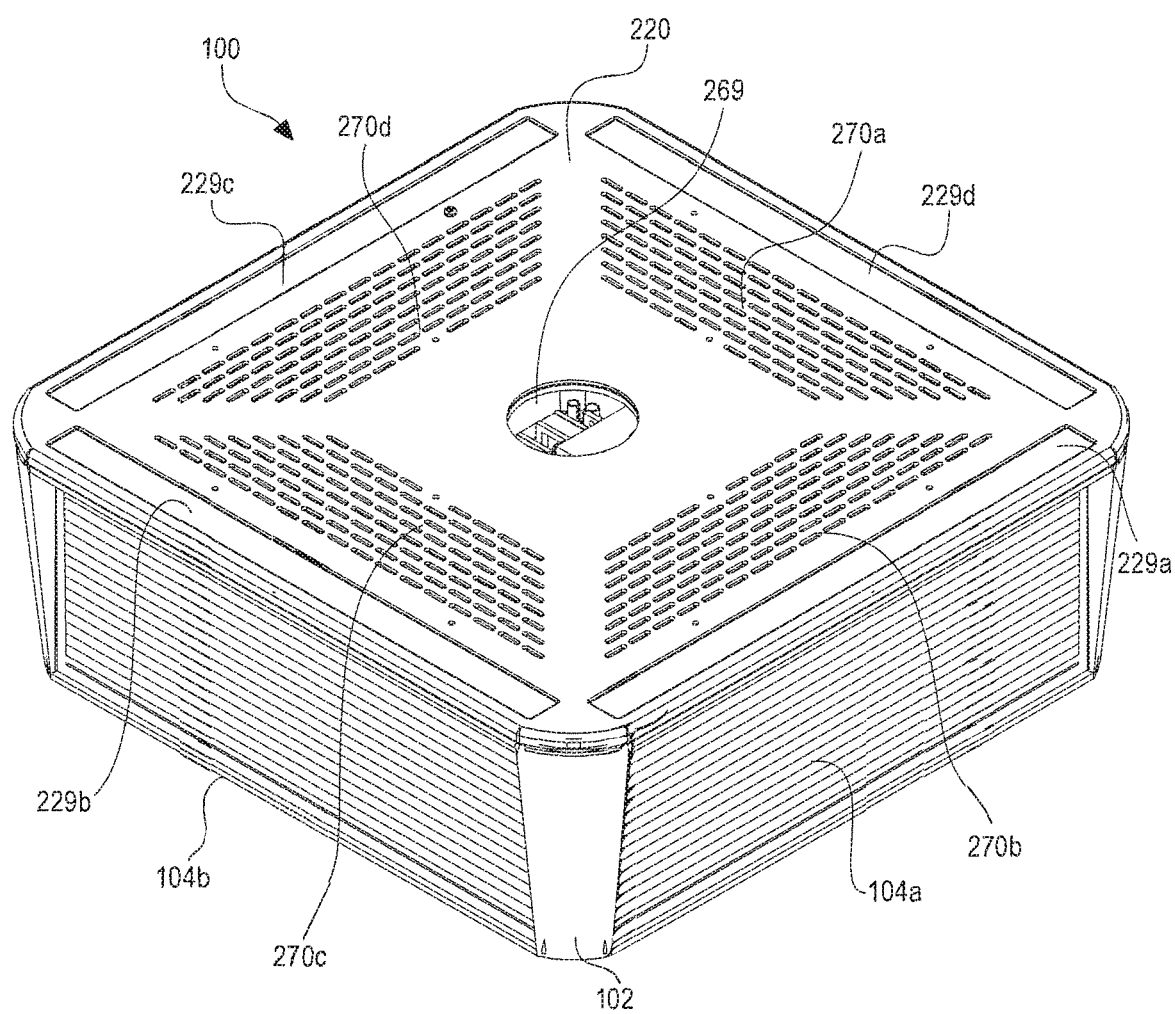
FIG. 2 is an isometric view from above of an embodiment of a luminaire.

A combination cover and heat transfer member 220 is secured to the auxiliary frame 122 by fasteners, such as screws 222 that extend through apertures 224 into threaded bores 226 in the auxiliary frame 122. The cover 220 includes a downwardly directed peripheral flange 227 that overhangs a shouldered peripheral portion 228 of the auxiliary frame 122. The cover 220 is preferably made of a thermally conductive corrosion-resistant material, such as aluminum, stainless steel, or any other suitable material. As seen in FIGS. 2 and 4, the cover 220 includes inwardly directed portions 229a-229d that are in thermal contact with upper surfaces of the flexible conductor 203 at the sections 210a-210d so that heat developed by the LEDs 105 is efficiently transmitted through the flexible conductor 203 and the cover 220 to ambient surroundings. Further, when the cover 220 is secured to the auxiliary frame 122, the seal members 140, 142, 144 and 146, 148, 150 contact and seal against inner surfaces 230 of the cover 220 on either sides of the sections 210a-210d. The seals 140a, 140b, 141a, 141b, 142a, 142b, and 143a, 143b as well as the seals 133a, 133b, 134a, 134b, 135c, 135c, and 136a, 136b and the peripheral flange 227 provide environmental barriers preventing exposure of components to water, dust, other contaminants, etc.

Referring to FIG. 3 the optical coupling members 190 substantially collimate the primarily lambertian distribution of light developed by each LED 105 and direct such light into the waveguides 104. Specifically, FIG. 12A illustrates an embodiment that includes a single refractive portion 190a-1 and two groups of reflective portions 190a-2a and 190a-2b. Also in the illustrated embodiment, each group of reflective portions 190a-2a and 190a-2b includes four reflective portions arranged on either side of the refractive portion 190a-1 in an arrangement that is symmetric about a center line equidistant from the first and second sides of the member 190a. The light developed by an LED element or module 105a is incident on the refractive portion 190a-1 and the reflective portions 190a-2. The light incident of the refractive portion 190a-1 is collimated and transmitted into the associated waveguide 104a wherein the degree of collimation is determined by a number of factors, including the shape of an interface surface 240 of the refractive portion 190a-1. Preferably, although not necessarily, the interface surface 240 is convex in shape (i.e., a center or middle portion of the surface 240 defined by the material of the coupling member 190a is disposed closer to the LED 105a than outer ends thereof) and further is arcuate, and, more particularly, preferably has a partial circular shape, in cross section. Still further, the reflective portion 190a-2 comprises a plurality of ridges 242a, 242b, 242c, . . . , 242N separated from one another by intervening troughs 244a, 244b, 244c, . . . , 244M. Each ridge 242, for example, the ridge 242a, is defined by an inner surface 246 parallel to the center line and an outer surface 248 that is inclined relative to the center line and that join one another at a sharp corner. As shown by the rays of FIG. 12A, the light incident on the inner surfaces 246 is refracted at the index interfaces at such surfaces and the refracted light rays travel through the material of the optical coupling member 190a and reflect off the outer surfaces 248 according to principles of total internal reflection and are directed in a substantially collimated fashion into the associated waveguide 104a. The degree of collimation is dependent upon a number of factors, including the geometries of the surfaces of the reflective portions 190a-2. Also, optical efficiency and light distribution are improved by ensuring that the surfaces of the ridges meet at sharp corners. In the illustrated embodiment shown in FIGS. 10, 11, 12, and 12B, each optical coupling member 190 and waveguide 104 has the dimensions recited in the following table, it being understood that the dimensions are exemplary only and do not limit the scope of any disclosure herein, except as may be recited thereby, together with equivalents thereof:

TABLE 1

| FIG. 12B | |
|---|---|
| A | 8 mm |
| B | 6.5 mm |
| C | 5.38 mm |
| D | 2.78 mm |
| F | 1.18 mm |
| G | 4 mm |
| H | 2.88 mm |
| J | 2.36 mm |
| K | 2.06 mm |

TABLE 1-continued

| | |
|---|---|
| M | 1.39 mm |
| N | 0.96 mm radius of curvature |

FIG. 10

| | |
|---|---|
| P | 304.55 mm |
| Q | 296.80 mm |
| R | 6.35 mm |
| S | 110.63 mm |

FIG. 11

| | |
|---|---|
| T | 312.42 mm |
| U | 296.80 mm |
| V | 298.59 mm |
| W | 7 mm |
| Z | 28.58 mm |
| Y | 57.15 mm |
| Z | 85.73 mm |
| AA | 115.78 mm |

FIG. 12

| | |
|---|---|
| AB | 123.72 mm |
| AC | 0.5 degrees |
| AD | 4.0 degrees |
| AE | 2.0 degrees |
| AF | 1.0 degrees |
| AG | 0.5 degrees |

Figure 22:
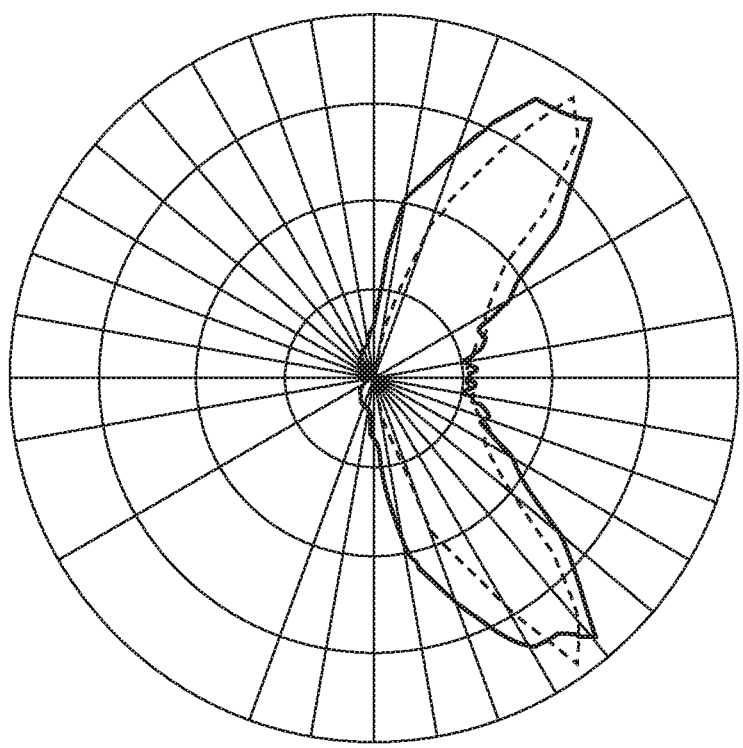
FIG. 22 is a diagram illustrating illumination distribution produced by the luminaire of FIG. 1.

Thus, light incident on the refractive portions 190a-1 and the reflective portion 190a-2 is collimated and directed into the waveguide 104a. The extraction features 104a-7 of the waveguide 104a cause the light injected into the waveguide 104a to exit the front surface 104a-9 and the scalloped features 104a-15 spread the light up and down. The remaining optical coupling members 190b-190d and the waveguides 104b-104d inject, transmit, and extract light developed by the LEDs 105 mounted on conductive portions of the sections 210b-210d of the flexible conductor 203 in the same fashion as the optical coupling member 190a and the waveguide 104a. The overall result, when the LEDs 105 are energized, is to produce a desired illumination distribution, for example, as illustrated by the simulation illumination diagram of FIG. 22. In the illustrated diagram, the distribution produced along a plane forming a 90° angle relative to two opposing waveguides 104 is shown with a dashed line. The distribution produced along a plane extending through two opposing corners 108 is shown with a solid line. A portion of the light is directed above the luminaire 100.

In further alternative embodiments, the waveguides 104 and coupling members 190 may be produced in any suitable fashion and placed into a mold and a frame may be molded about the waveguides 104 and coupling members 190. In such an embodiment the auxiliary frame 122 may not be needed.

If desired, the flexible circuit conductor 203 may include a surface 260 adjacent the LED elements or modules 105 that has a white or specular reflective coating or other member secured or otherwise applied thereto.

Figure 14:
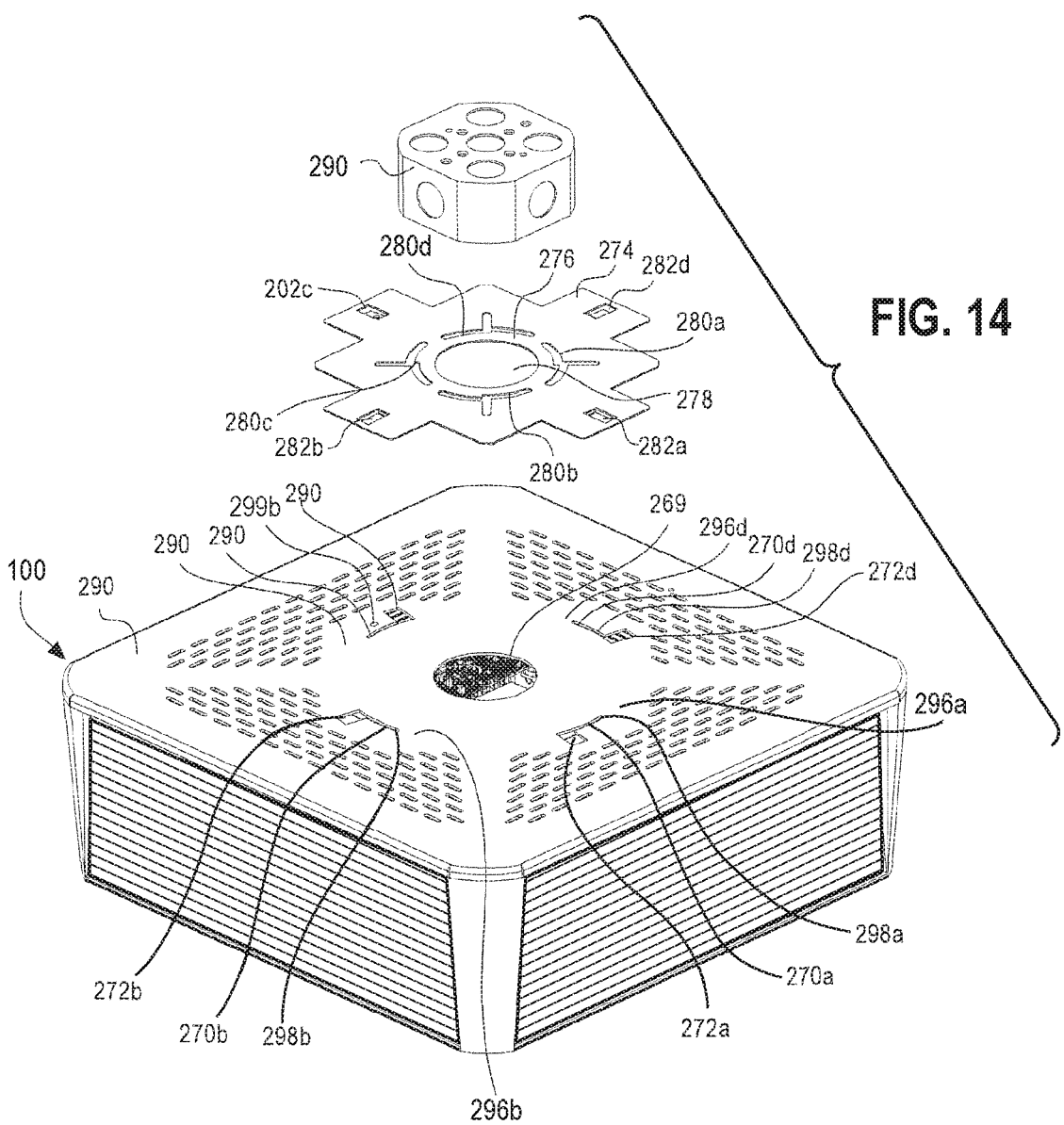
FIGS. 14 and 14A are isometric views of embodiments of junction box mountable luminaires.
Figure 14A:
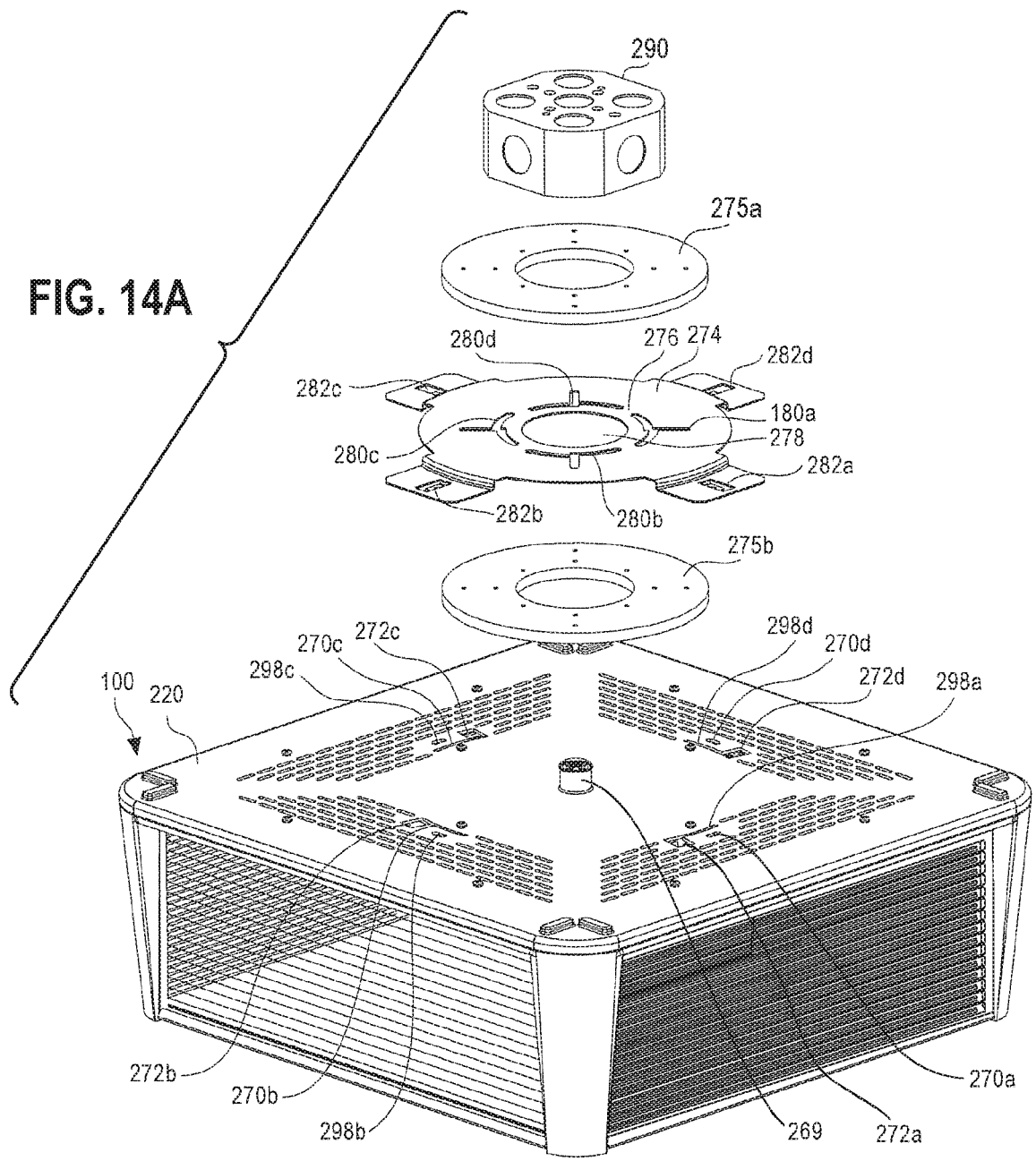

Referring next to FIGS. 14-21, the cover 220 is adapted to be secured to any one of various devices so that the luminaire can be suspended from a ceiling, for example, of a parking deck or garage, or the luminaire can be pendant mounted, or mounted on other devices, such as a trunnion, junction box, pole, etc. Specifically, the cover 220 is generally planar and includes a central opening 269 and a plurality (such as four) arcuate slots 270a-270d (FIG. 14) surrounding the central opening 269 wherein each slot 270a-270d has an enlarged opening 272a-272d, respectively. A mounting plate 274 includes a central section 276 having a central aperture 278 and a plurality of combined arcuate and radial slots 280a-280d that surround the central aperture 278. The mounting plate 274 further includes a plurality of tabs 282a-282d that is offset with respect to the remaining planar portions of the plate 274. Assuming for the sake of illustration that the luminaire is to be mounted to a junction box 290 (FIG. 14), the mounting plate 274 is mounted first to the junction box 290 with the tabs 282a-282d offset in a direction extending away from the junction box 290 using screws or other fasteners 292 that extend through two or more of the combined arcuate and radial slots 280a-280d into threaded bores in the junction box 290. The assembled luminaire 100 is thereafter suspended by one or more sections of, for example, aircraft cable or wire rope, from the junction box 290 (FIG. 14) and electrical connections are made to the operating circuitry 112 (FIG. 4) in the central enclosure 110 using conventional wire nuts or otherwise. The wires are tucked into the junction box 290 and the luminaire 100 is then raised such that the cover 220 is located adjacent the mounting plate 274. The luminaire is then manipulated such that the offset tabs 282a-282d are inserted into the enlarged openings 272a-272d of the arcuate slots 270a-270d. The luminaire 100 is then turned to move the tabs 282a-282d out of alignment with the enlarged openings 272a-272d and so that the tabs 282a-282d are disposed under sections 296a-296d at or near ends 298a-298d of the slots 270a-270d. A screw 299a is then threaded into a threaded bore 299b in the cover 220 to prevent further rotation of the luminaire 100 and to secure the luminaire 100 to the junction box 290. Further, other ways of securing the luminaire 100 to a junction box may be used. For example, the luminaire 100 of FIG. 14A may be mounted to the junction box 290 with gaskets 275a, 275b positioned between the junction box 290 and the mounting plate 274 and between the mounting plate 274 and the cover 220.

Figure 15:
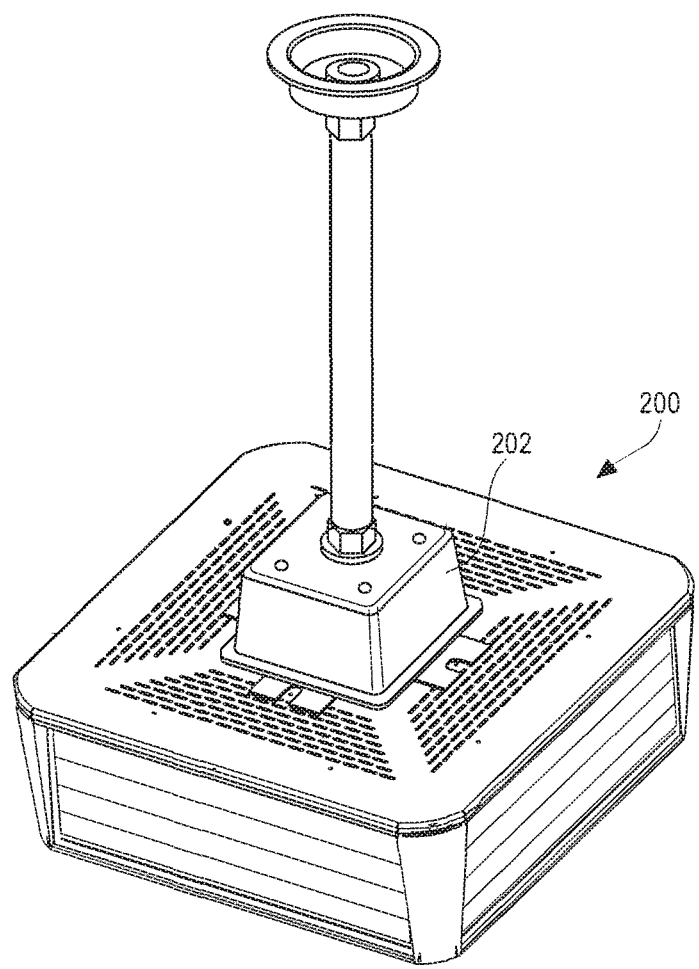
FIG. 15 is an isometric view of an embodiment of a pendant or pole mounted luminaire.
Figure 16:
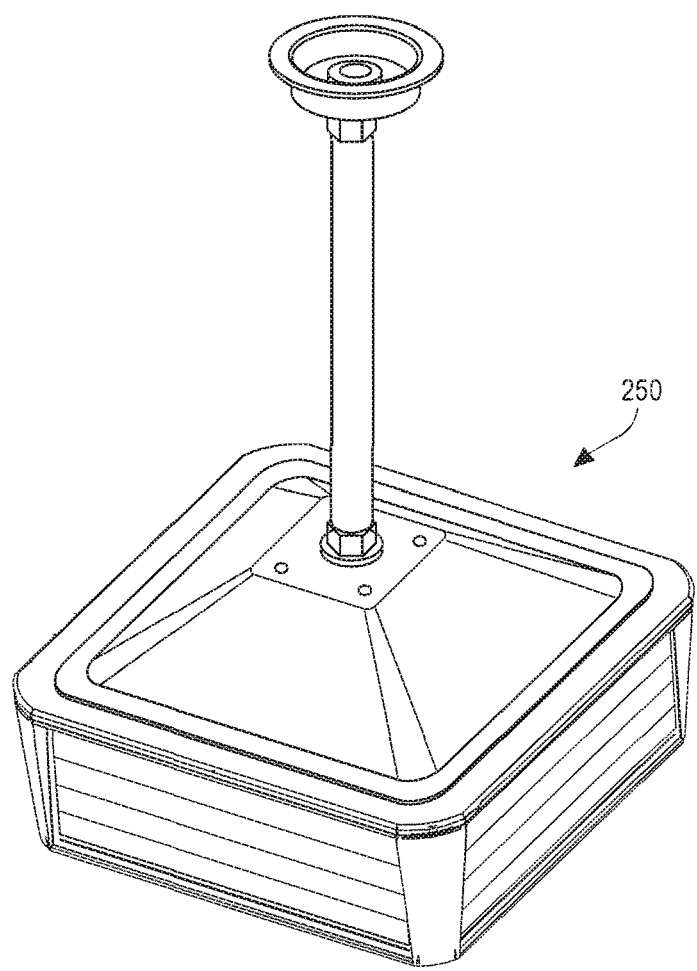
FIG. 16 is an isometric view of an embodiment of a pendant mounted luminaire with a bird guard.
Figure 17:
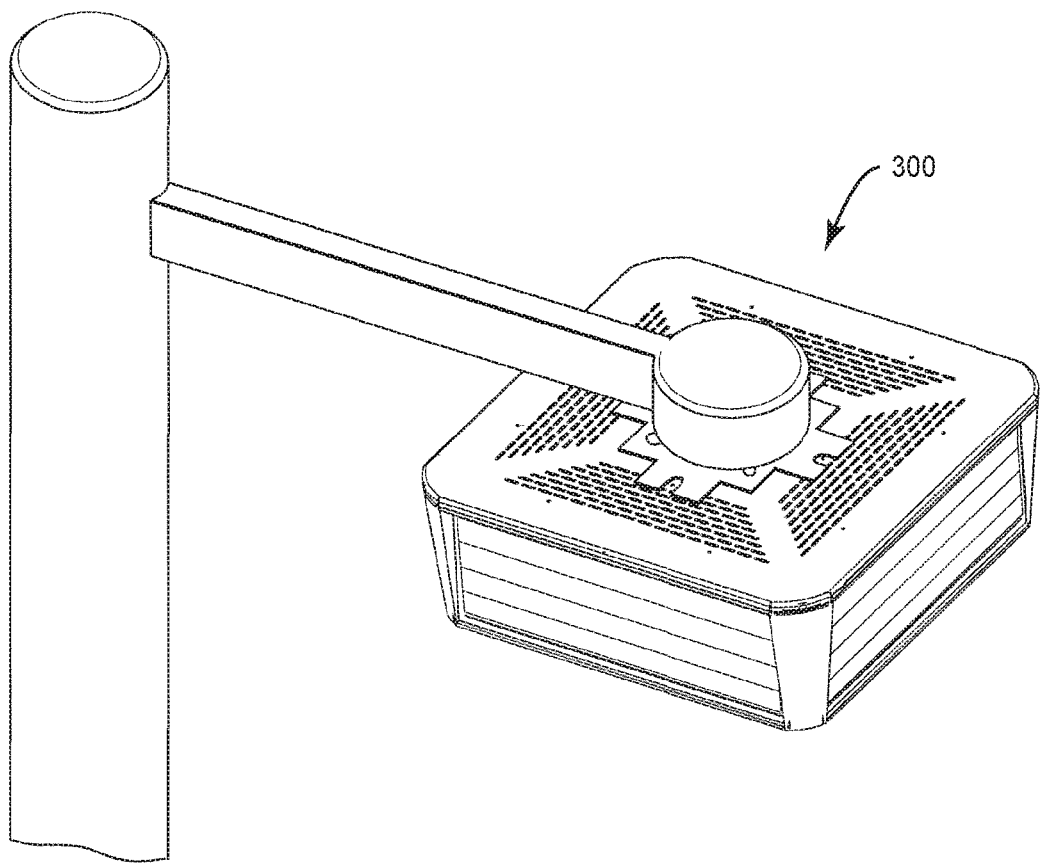
FIGS. 17 and 18 are top and bottom isometric views, respectively, of an embodiment of a post mounted luminaire.

As should be evident, the luminaire can be secured to other structures or elements using the mounting plate 274 or another suitable device. The luminaire can be mounted as a single unit, or may be mounted adjacent other luminaires in groups (FIGS. 15-21). Referring to FIG. 15, a luminaire 200 includes a bird guard 202 around the junction box (not shown). FIGS. 16-21 illustrate luminaires 250, 300, 350, 406, 450, and 500, respectively, in various mounting arrangements.

Figure 13A:
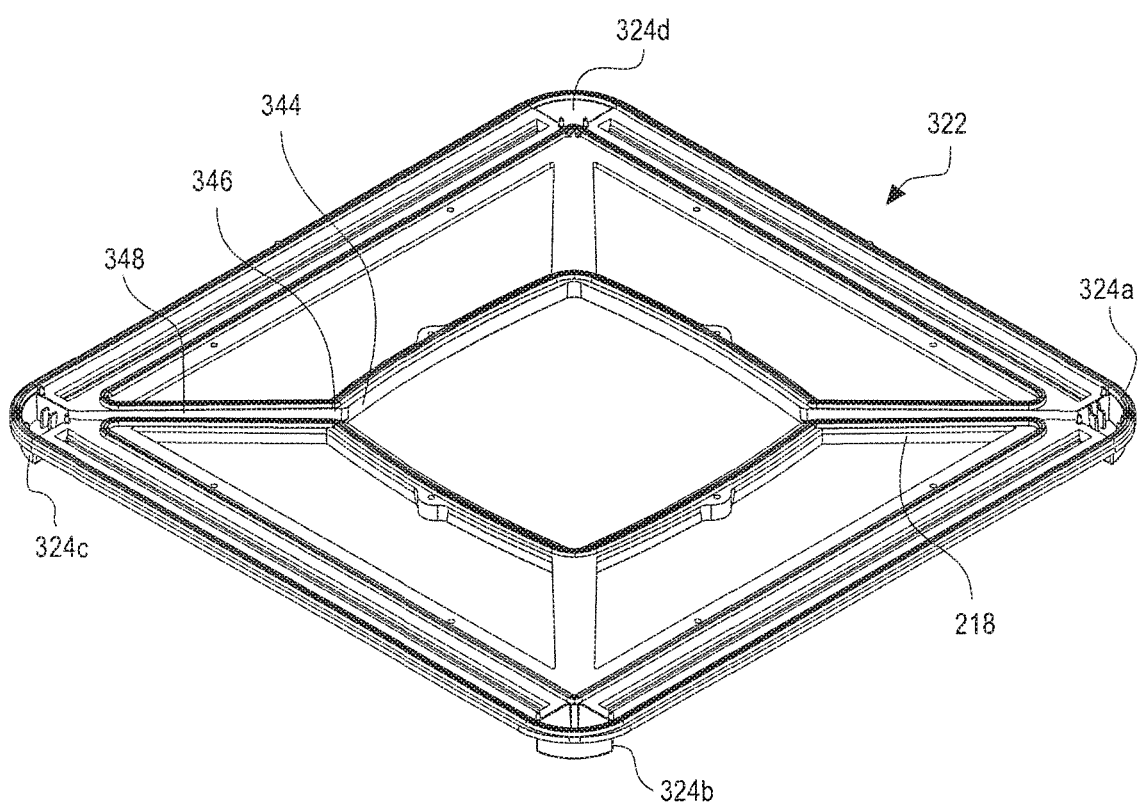
FIG. 13A is an isometric view of an alternative embodiment of the auxiliary frame of FIG. 13.

If desired, the cover 220 may be provided without the central cover portion 127 of the auxiliary frame 122 (see FIG. 13A). In this case the cover 220 may be provided with seal members (not shown) forming a gasket that seals against upper surfaces of the central enclosure 110. Alternatively, if the central cover portion 127 is provided as shown in FIG. 7, a mounting collar (not shown) may be formed therewith or secured thereto. The mounting collar may extend upwardly through the central opening 129 of the cover 122. The collar may include a threaded radial hole to accept a set screw so that the luminaire may be secured to an overhanging vertical pole end (not shown) that is received in the collar.

Still further, the continuous flexible conductor 203 may be replaced by discontinuous flexible or rigid electrically conductive members. Thus, for example, as seen in FIG. 13, first through fourth circuit boards 340a-340d each of which includes the LED elements or modules mounted thereon overlie the channels 130a-130d, respectively. In the illustrated embodiment, a further notch 344, an aperture 346, and a channel 348 like the notch 215, the aperture 216, and the channel 218 is provided diametrically opposite to channel 218 such that the channel 348 extends through the arm 126c of the auxiliary frame 322. Corner connectors 342a and 342*b* disposed in the nesting portion 324*a* and 324*c* may be provided to facilitate connection to the operating circuitry 112 in the central enclosure 110. Further corner electrical connectors (not shown) may be disposed and retained within the nesting portions 324*b* and 324*d*, respectively, and interconnect adjacent circuit boards 340*a*, 340*b* and 340*c*, 340*d*, respectively. In this arrangement, equal numbers of different circuit board and connector configurations can be produced and installed, as opposed to unequal numbers of different components, possibly leading to decreased fabrication costs. In another embodiment, electrical power may be supplied by wires extending from the central enclosure 110 through a single channel of the auxiliary frame 122. In this case, corner electrical connectors 342*a*, 342*b*, and 342*c* are disposed and retained within the nesting portions 124*a*, 124*b*, and 124*c* and interconnect adjacent circuit boards 340*a*, 340*b* and 340*b*, 340*c* and 340*c*, 340*d*, respectively. The circuit boards 340*a* and 340*b* are interconnected by a corner electrical connector 352*a* identical to the corner electrical connectors 342*a*, 342*b* and disposed and retained within the nesting portion 124*a*.

If desired, the upstanding bottom walls 116*a*-7 through 116*d*-7 and the base surfaces 116*a*-8 through 116*d*-8 of the main frame 114 may be omitted and channel members 399*a*-399*d* (FIG. 13) may be substituted therefor that receive the bottom ends 104*a*-3 through 104*d*-3 of the waveguides 104*a*-104*d*, respectively. Ends 399*a*-1 and 399*a*-2 of the channel member 399*a* are slid into and are retained within bottom portions of the side channels 116*a*-5 and 116*a*-6. In like fashion the channel members 399*b*, 399*c*, and 399*d* are retained within the side channels 116*b*-5 and 116*b*-6, 116*c*-5 and 116*c*-6, and 116*d*-5 and 116*d*-6.

In summary, the plurality of waveguides is disposed on the housing. A flex conductor or circuit boards are placed adjacent the top edges of the waveguides and the flex conductor or circuit boards are enclosed by a cover that acts as a heat sink.

The housing and lid along with an integrated seal join the four (or a different number of) waveguides that make up the sides of the luminaire and integrate the enclosure for the power supply, sensor, operating circuits, and wire connection area. The continuous flex conductor or circuit boards present the LEDs to the waveguide coupling members, and avoids the need for wire harnesses at each corner. This allows for minimal use of materials resulting in a low cost luminaire.

The housing provides a unique aesthetic in which optical waveguides serve as the side walls of the luminaire. Material and costs associated with the luminaire are minimized. The design results in superior lighting with minimal glare. The optic feature of the fixture is integrated into the main housing, which results in a more robust structure and aids in the sealing between components.

The waveguide optics are used in this design to achieve high lumen output with low glare. This is accomplished by directing the light downward at an angle and spreading the illumination across a large area. The light from the LED's is pointed directly into each waveguide as opposed to being bounced off a reflective surface of a reflector (i.e., indirect illumination). This optical solution is more efficient than current indirect systems and allows the glare value to be adjusted by changing the illuminated area.

In an embodiment, each waveguide is made of optical grade acrylic and the LED's are optically coupled to the waveguide using a liquid silicone rubber ("LSR") member or other member. The LSR is shaped to serve as the entrance geometry for the optical system by directing light from the LED's directly into the waveguide.

If desired, the waveguides (with or without the optical coupling members) may be insert molded with the housing, thereby making the waveguide and housing a singular piece and eliminating the need for seals between the waveguides and the housing. This reduces assembly time and makes for a more robust luminaire structure. In a specific version of the embodiment, a thermoplastic elastomer ("TPE") seal is molded onto the housing to seal the fixture and protect the LED's and related circuitry from the environment. In yet another embodiment, the TPE seal is molded onto a top plate or lid that is placed on top of the housing.

The housing also includes a mounting plate that adds additional strength to the housing. In an embodiment, the mounting plate is made out of a metallic material and is molded into the plastic housing to strengthen the area of the fixture where it is mounted. In yet another embodiment, the mounting plate is molded into a plastic cover member or lid.

The luminaire multifunctional housing can be used with several installation options (e.g., pendant, trunnion, junction box, pole), as shown. The housing also results in ease of installation because the center section access is allowed from the top of the luminaire.

In an embodiment, the use of plastic avoids the need for post processing such as painting and the application of other expensive coating systems to protect the luminaire from the environment. In an embodiment, the lid is made out of sheet metal so that it can be used as a heat sink and, therefore, does not require painting or coating, unlike a metal casting. In still another embodiment, the lid can be made of plastic or the sheet metal lid can be overmolded with plastic to create mounting features.

Any of the embodiments disclosed herein may include a power circuit that may further be used with light control circuitry that controls color temperature of any of the embodiments disclosed herein in accordance with viewer input such as disclosed in U.S. Patent Publication No. 2015/0351187, filed May 30, 2014, entitled "Lighting Fixture Providing Variable CCT" by Pope et al. incorporated by reference herein.

Further, any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. Pat. No. 8,975,827, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry includes at least one of a network component, an RF component, a control component, and a sensor. The sensor may provide an indication of ambient lighting levels thereto and/or occupancy within the illuminated area. Such sensor may be integrated into the light control circuitry and may cause the luminaire to adjust output lighting levels as a function of ambient light levels and/or detected motion.

Figure 23:
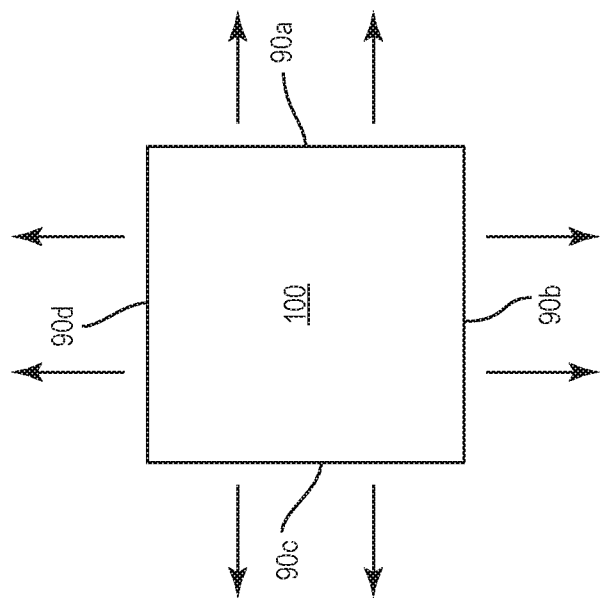
FIG. 23 is a schematic diagram of a luminaire that emits light in multiple directions.

The luminaire 100 is configured to emit light radially outward as illustrated in FIG. 23. Light is emitted outward from each of the sides 90*a*-90*d*. There can be applications in which it is desirable for the luminaire 100 to emit light in limited directions. This can include preventing any light from being emitted in one or more directions, or substantially limiting the light from being emitted in the one or more directions (e.g., when the luminaire 100 is mounted in a garage and it is desired that no light is emitted outward beyond the garage).

Figure 24:
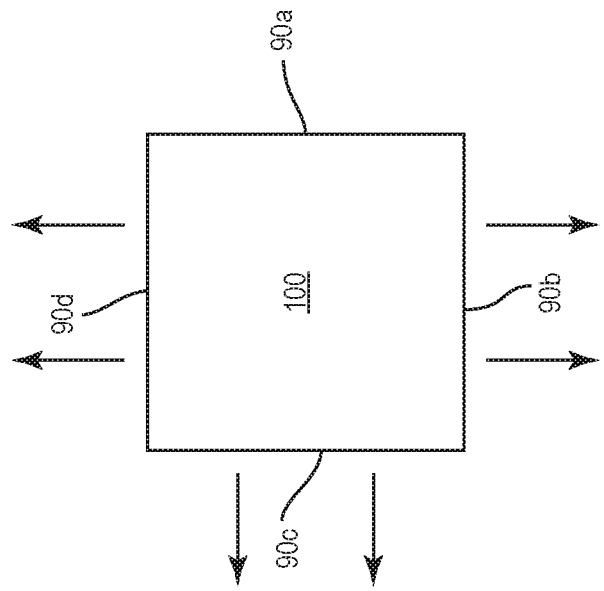
FIG. 24 is a schematic diagram of a luminaire configured to prevent light from being emitted in one or more directions.

FIG. 24 illustrates an embodiment in which light is emitted in limited directions from the luminaire 100 from the sides 90b-90d. In this embodiment, light is not emitted outward from side 90a. In another design, an amount of light emitted from side 90a is substantially less than that from sides 90b-90d.

In one embodiment, the luminaire 100 includes a frame 114 with multiple different sides. At least two light-emitting sections are positioned in the frame 114. Each of the light-emitting sections is configured to emit light outward from one of the sides and includes one or more LEDs 105 and an optical waveguide 104. The luminaire 100 also includes at least one blank section positioned in the frame. Each of the blank sections is configured to prevent light from being emitting outward from one of the sides of the frame 114.

The luminaire 100 can include a variety of different shields configured to prevent light from being emitted from one or more of the sides. The shields can include various structures and configurations.

Figure 25:
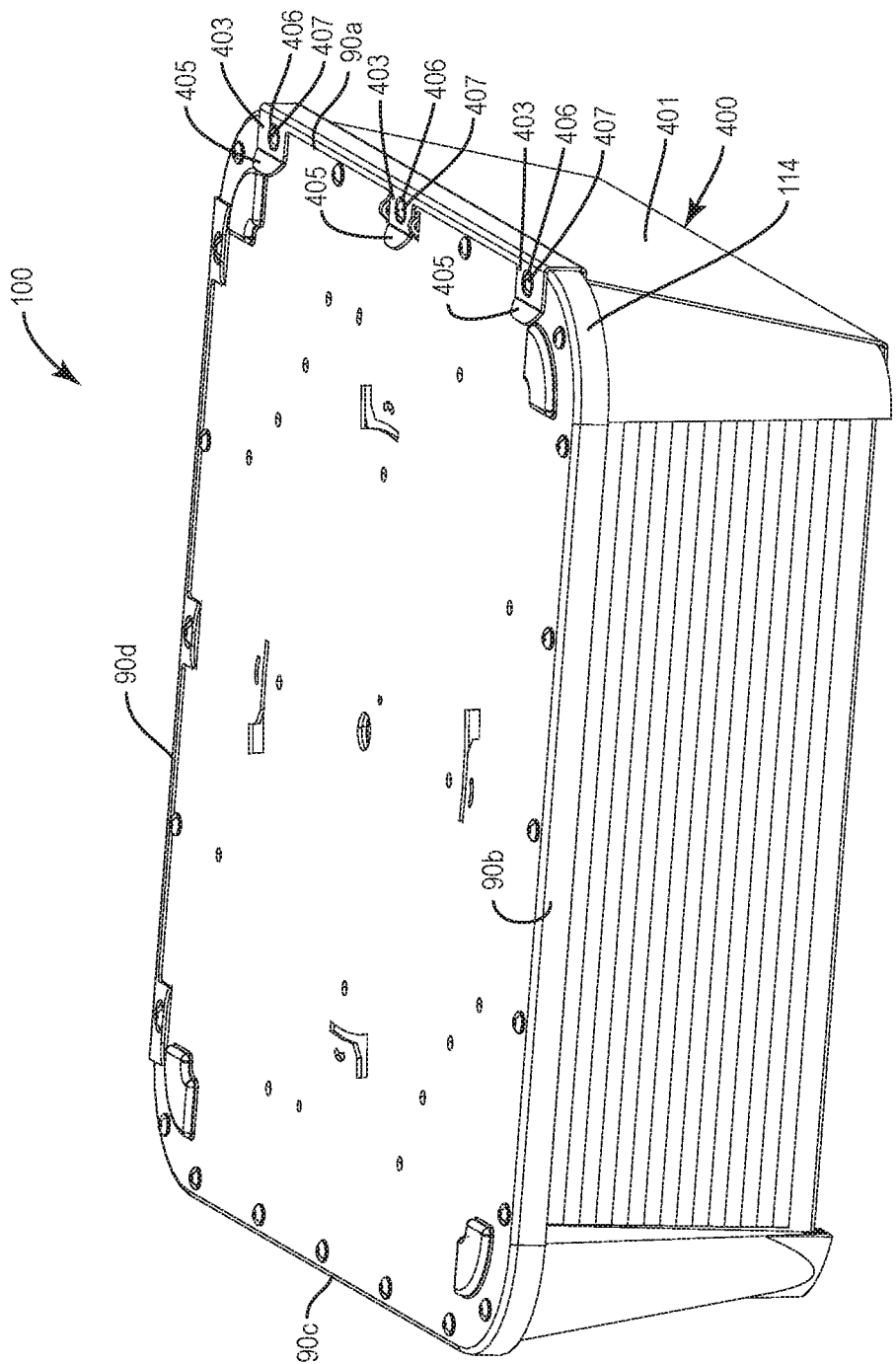
FIG. 25 is a perspective view of a light shield mounted to a luminaire.
Figure 26:
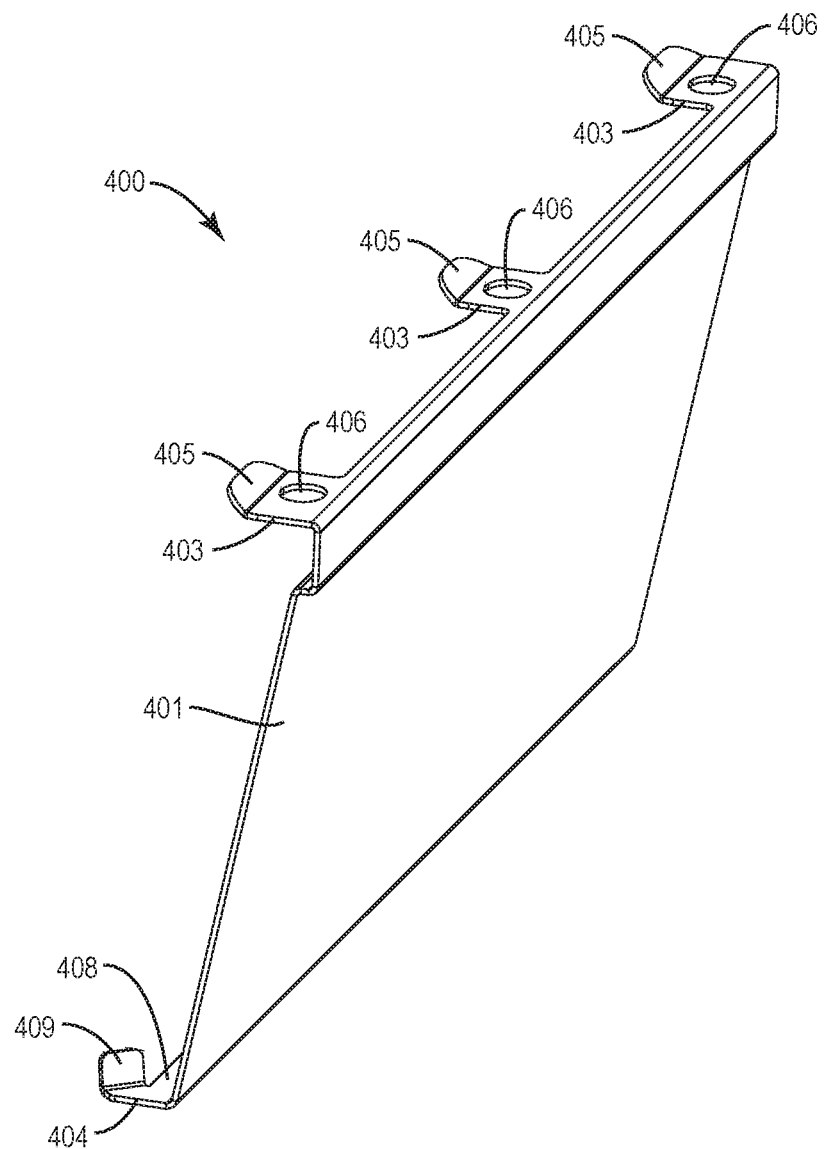
FIG. 26 is a front perspective view of a light shield.
Figure 27:
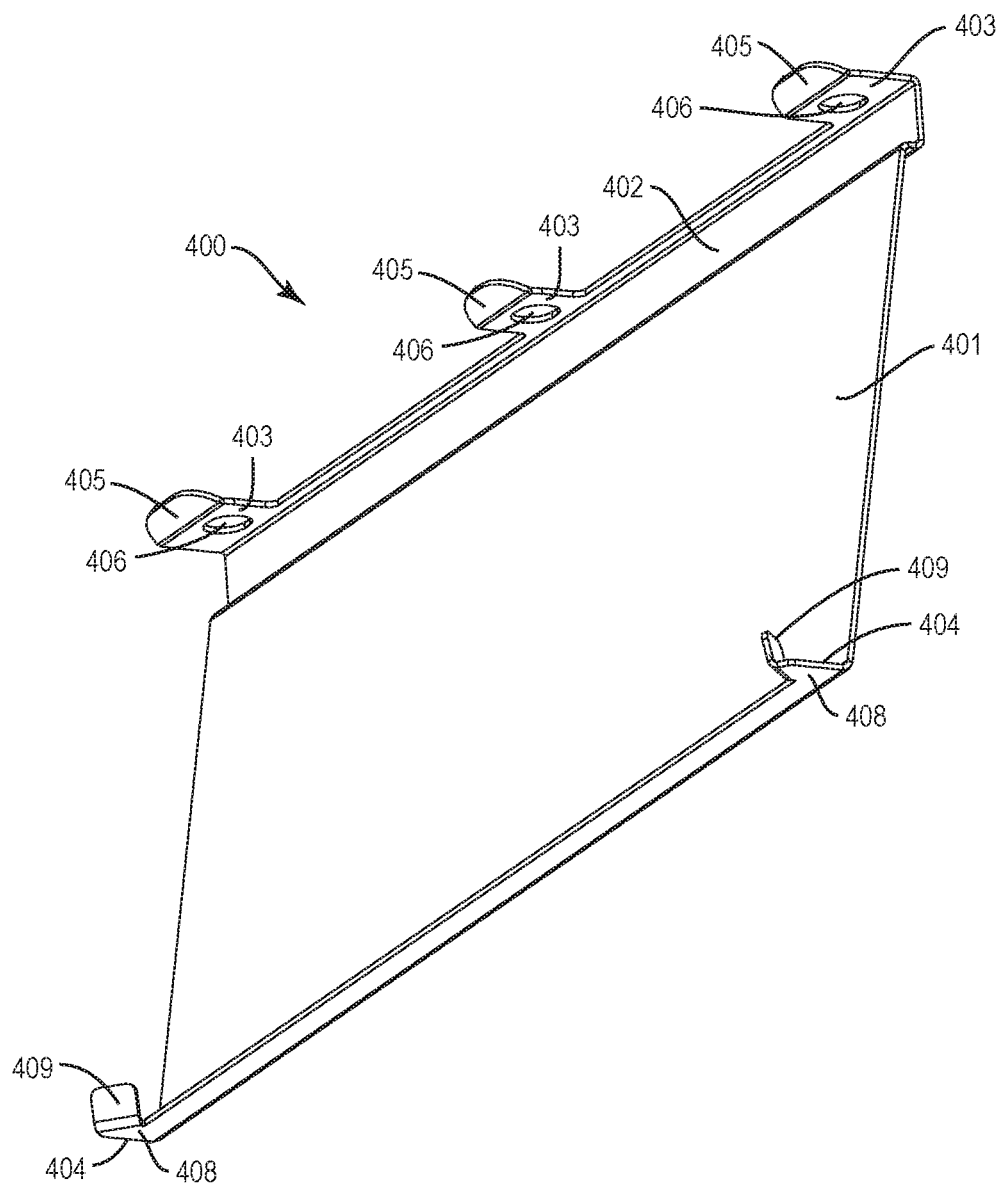
FIG. 27 is a rear perspective view of the light shield of FIG. 26.

One embodiment of preventing light from being emitted from a side 90 of the luminaire 100 is with a light shield 400. The light shield 400 can be shaped and sized to conform to the dimensions of the luminaire 100. This provides for the light shield 400 to be securely attached to the luminaire 100 and prevent light from being emitted from one or more of the sides. In one design, the light shield 400 is sized to extend along one of the sides 90 of the luminaire 100. FIG. 25 discloses a light shield 400 disposed along side 90a to prevent light from being emitted outward from the side 90a. The light shield 400 is positioned and/or configured for light to be emitted from the other sides 90b-90d.

As illustrated in FIGS. 25-28, the light shield 400 includes a mask area 401 sized to extend across and overlap with the waveguide 104 positioned on the side 90a of the luminaire 100. The shape and size of the mask area 401 can be equal to or greater than the waveguide 104. In one embodiment, the mask area 401 is sized to extend across the waveguide 104 and contact against the supporting structure that is adjacent to the sides of the waveguide 104. The mask area 401 can be planar to be positioned along the face of the waveguide 104. In one design, the mask area 401 contacts against the waveguide 104 when the light shield 400 is mounted to the luminaire 100. In another embodiment, the mask area 401 is spaced outward and away from the waveguide 104 when the light shield 400 is mounted to the luminaire 100.

In another embodiment, the mask area 401 is shaped and sized to extend across a limited portion of the waveguide 104. This light shield 400 reduces the amount of light that is emitted from the side 90a.

The inner surface of the mask area 401 faces towards the waveguide 104. The inner surface can be configured for the emitted light to be reflected back into the luminaire 100. This provides for the light to be re-used and recycled for emittance outward in another direction. In one embodiment, the inner surface provides a diffused reflecting surface. In one embodiment, the inner surface of the mask area 401 is anodized aluminum.

In another embodiment, the mask area 401 is constructed from a tinted panel. The mask area 401 can include a translucent or transparent material with a coating or film applied to one side. In one embodiment, the tinting is applied to the inner side to protect the tinting from the environment. The tinting can change the characteristics and/or amount of light that is emitted outward from the side. In one design, the entire light shield 400 is constructed as a single, unitary member with tinting extending across an entirety or just a limited portion of the mask area 401. In another design, the mask area 401 is constructed from a first material, and the other components of the light shield 401 including the rib 402, ears 403, and feet 404 are constructed from one or more different materials that are attached to the mask area 401.

Figure 28:
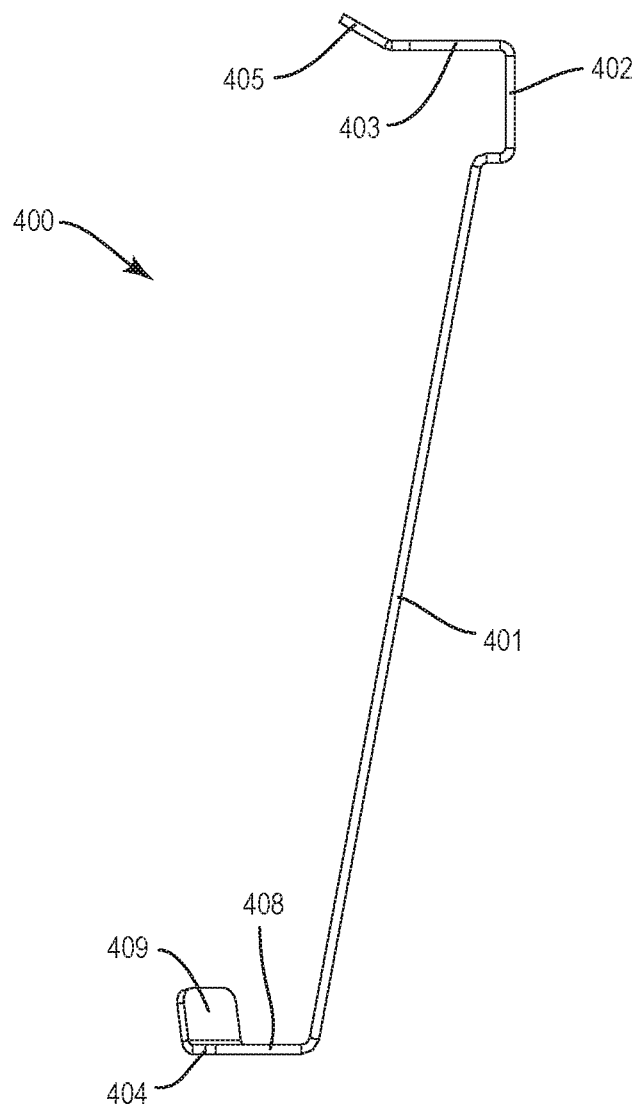
FIG. 28 is an end view of the light shield of FIGS. 26 and 27.

The rib 402 extends across one side of the mask area 401. As illustrated in FIG. 28, the rib 402 is laterally offset from the mask area 401. This offset can conform to the shape and size of the support structure of the luminaire 100. Ears 403 extend inward from the rib 402. The ears 403 are configured to contact against a top of the luminaire 100 to secure the light shield 400. A tab 405 can be positioned at an end of each ear 403. The tab 405 angles upward relative to the ear 403 to be positioned above the top of the luminaire 100. This positioning can facilitate attachment and removal of the light shield 400.

Figure 29:
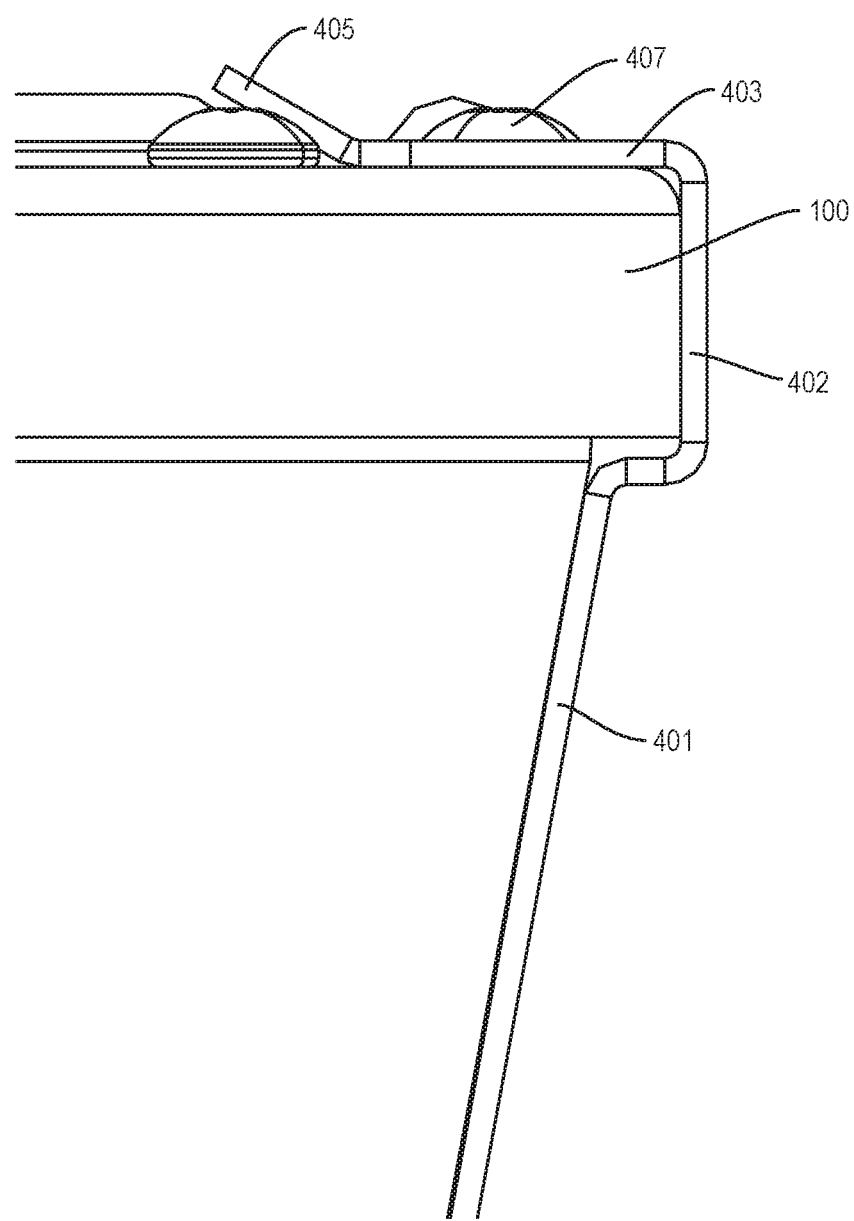
FIG. 29 is a partial side view of a light shield mounted to a luminaire.

An opening 406 can extend through each tab 405. The opening 406 is sized to extend over a fastener head 407 on the top of the luminaire 100. This positioning is illustrated in FIGS. 25 and 29 with the ears 403 positioned on the top of the luminaire 100 and the fastener heads 407 positioned in the openings 406. The tabs 405 angle upward above the top of the luminaire 100.

The number of ears 403 that extend outward from the rib 402 can vary. In one embodiment, ears 405 are positioned at each of the outer corners of the rib 402. One or more additional intermediate ears 405 can extend along the length of the mask area 401. The ears 405 can include the same or different shapes and/or sizes.

A shelf 408 extends across one side of the mask area 401 opposite from the rib 402. The shelf 408 is configured to extend under and engage with a bottom of the luminaire 100. The angular orientation of the shelf 408 relative to the mask area 401 can vary, as well as the length of the shelf 408 measured outward from the mask area 401. Feet 404 extend outward from the shelf 408. The feet 404 are positioned at the outer ends of the shelf 408. The feet 404 each include a tab 409 that extends upward from the shelf 408.

Figure 30:
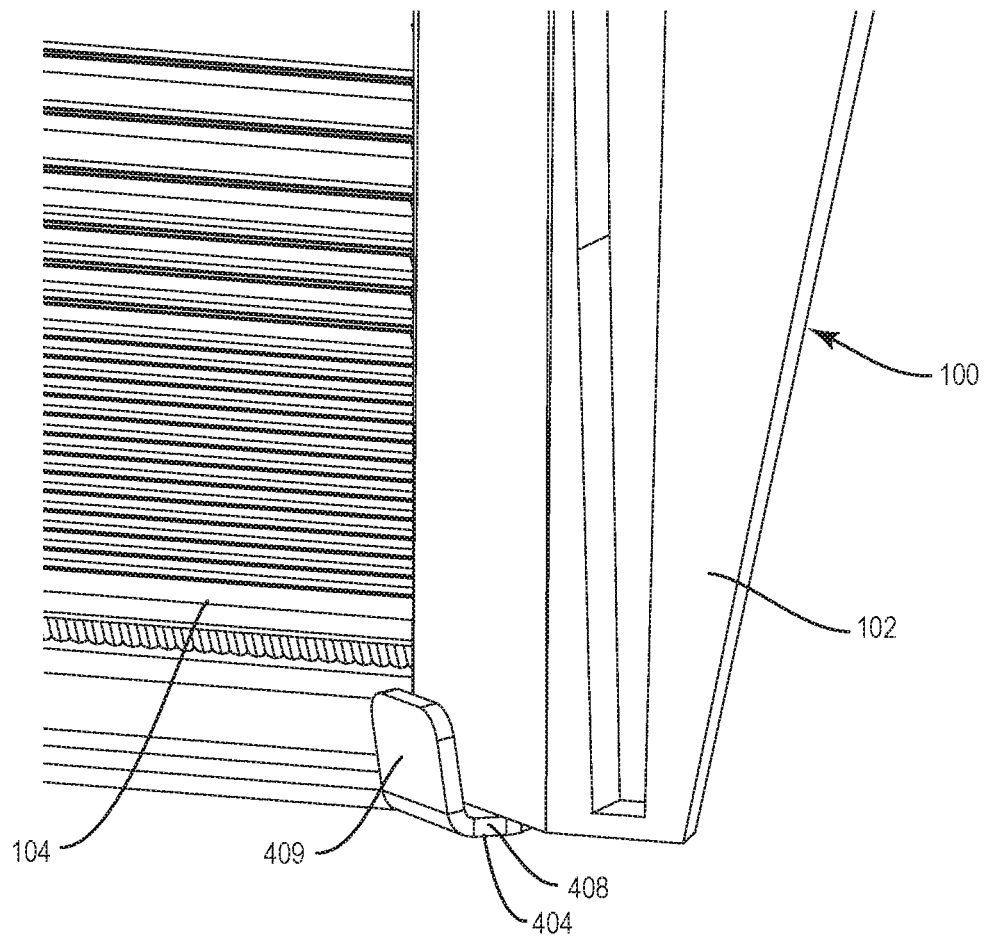
FIG. 30 is a partial side view of a light shield mounted to a luminaire.

FIGS. 29 and 30 illustrate attachment of the light shield 400 to the luminaire 100. FIG. 29 illustrates an upper edge of the light shield 400 attached to the luminaire 100, and FIG. 30 illustrates a lower edge attached to the luminaire 100. As illustrated in FIG. 30, the feet 404 are positioned underneath the luminaire 100, and specifically positioned below the housing 102. In one design, the housing 102 includes an opening to allow for the passage of water. The feet 404 are positioned away from the opening to allow the water to drain out of the housing 102. The shelf 408 extends along the bottom of the housing 102, and the tab 409 is positioned upward along an inner side of the housing 102.

In one embodiment, the light shield 400 is constructed as a single, integral piece. During installation, the ears 403 and/or feet 404 are forced outward during attachment to the luminaire 100. Once positioned, the outside force is removed and the light shield 400 applies a clamping force on the luminaire 100 to maintain the attachment. The light shield 400 can be constructed from a variety of different materials, including but not limited to various metals such as aluminum, ceramics, and plastics. In one design, a main section of the light shield 400 includes the mask area 401, rib 402, and shelf 408 and is constructed from a first piece. The ears 403 and feet 404 are different pieces that are attached to the main section.

During attachment of the light shield 400 to the luminaire 100, the feet 404 may be initially positioned along the bottom of the luminaire 100. This can include positioning the feet 404 along the bottom of opposing sections of the housing 102. Once positioned, the light shield can be pivoted about the feet 404 with the top edge moved into contact with the luminaire 100. This can include contacting the ears 403 against the top corner of the luminaire 100 and expanding the ears 403 and/or feet 404 outward. The light shield 400 can be pivoted farther with the tabs 405 contacting against and riding up and over the fastener heads 407. Once the ears 403 move a distance along the fasteners heads 407, the fastener heads 407 align in the openings 406. One or both of the ears 403 and feet 404 can deform outward during the attachment. The light shield 400 can be configured to provide a snap-fit onto the luminaire 100. This movement can provide a snap-fit configuration and a tactile feel to the installer to provide a positive feedback that the light shield 400 is mounted on the luminaire 100. Further, the light shield 400 can be installed without the use of tools.

Figure 31:
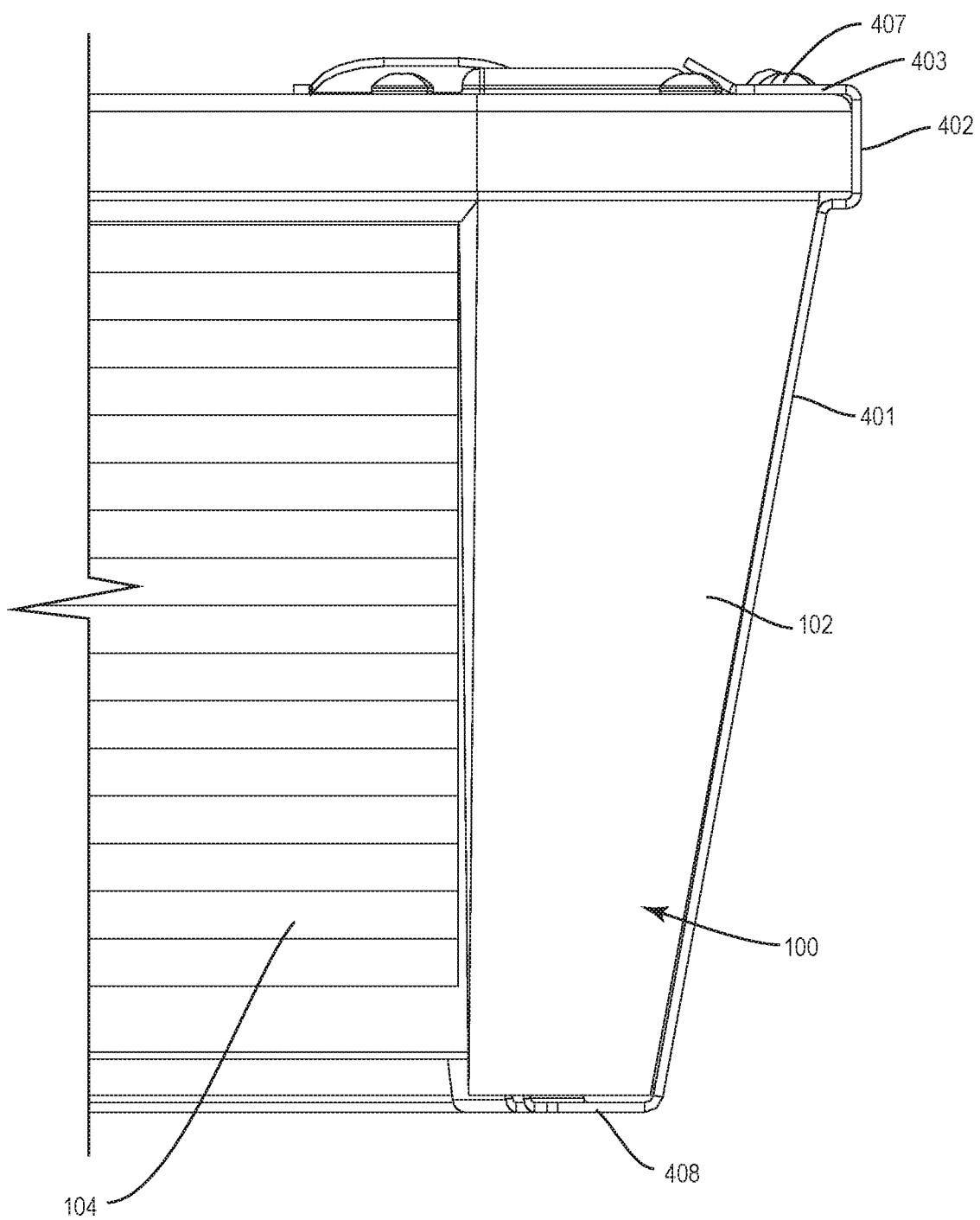
FIG. 31 is a side view of a light shield mounted to a luminaire.

As illustrated in FIGS. 29, 30, and 31, the light shield 400 can closely conform to shape of the luminaire 100. This can include the mask area 401 contacting against the sections of the housing 102 adjacent to the waveguide 104. This prevents and/or reduces light from being emitted through cracks formed between the light shield 400 and the luminaire 100.

The exterior of one or more portions of the light shield 400 can be treated to correspond to the housing 102. In one embodiment, a painting or coating is applied to one or more portions of the light shield 400 to visually complement the color of the housing 102. The painting or coating can provide for changing the aesthetic appearance of the combined luminaire 100 and light shield 400.

In one design, one or more perforations can extend through the mask area 401. The perforations provide for a limited amount of light to be emitted in the otherwise blocked direction. The perforations can produce special lighting effects.

Figure 32:
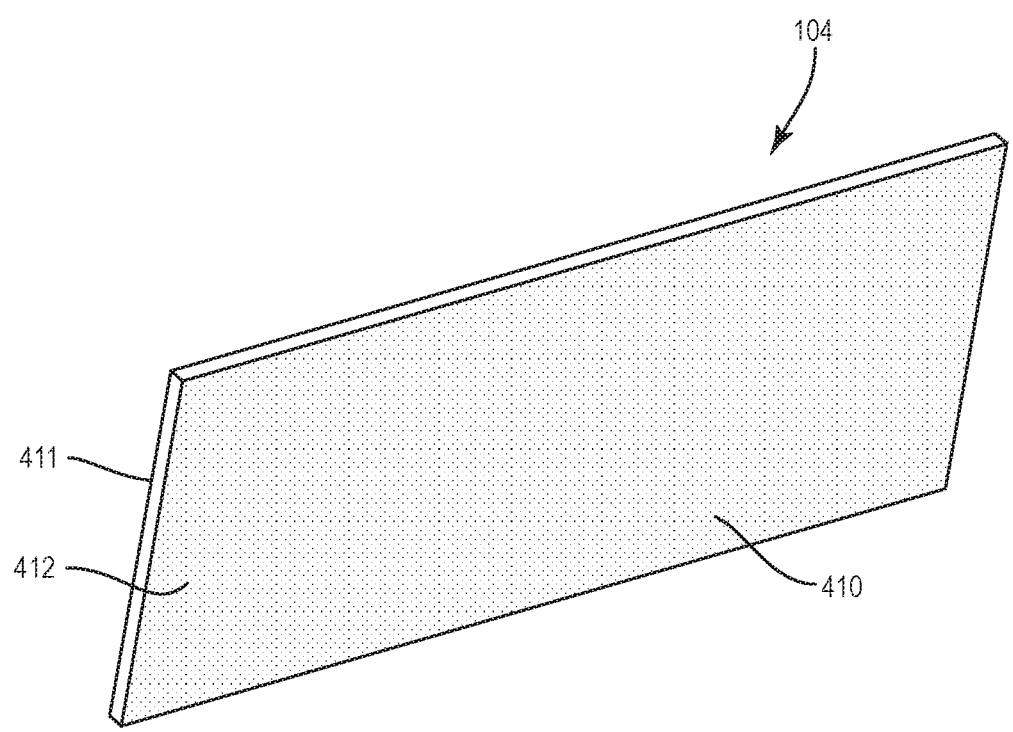
FIG. 32 is a schematic diagram of a waveguide with a coating to prevent the passage of light.

Another shield to prevent light from being emitted from the luminaire 100 is a coating 410 on the waveguide 104 as illustrated in FIG. 32. The coating 410 prevents the light from being emitted outward from the luminaire 100. The coating 410 can also be configured to provide for a reduced amount of light to be emitted from the side. The coating 410 can be on one or both of the inner side 411 and/or the outer side 412 of the waveguide 104. In one embodiment, the coating 410 forms an opaque surface on one or both of the inner and outer sides 411, 412 to prevent the passage of light. In another embodiment, the coating 410 provides a tinting to the waveguide 104. The tinted coating 410 can change the characteristics and/or amount of light that is transmitted from the side.

The embodiments of the shields including the light shield 400 and the coating 410 include the shield in an overlapping arrangement with the waveguides 104. That is, the shield and the waveguide 104 are in an overlapping arrangement relative to the direction that light is emitted from the side.

Figure 33:
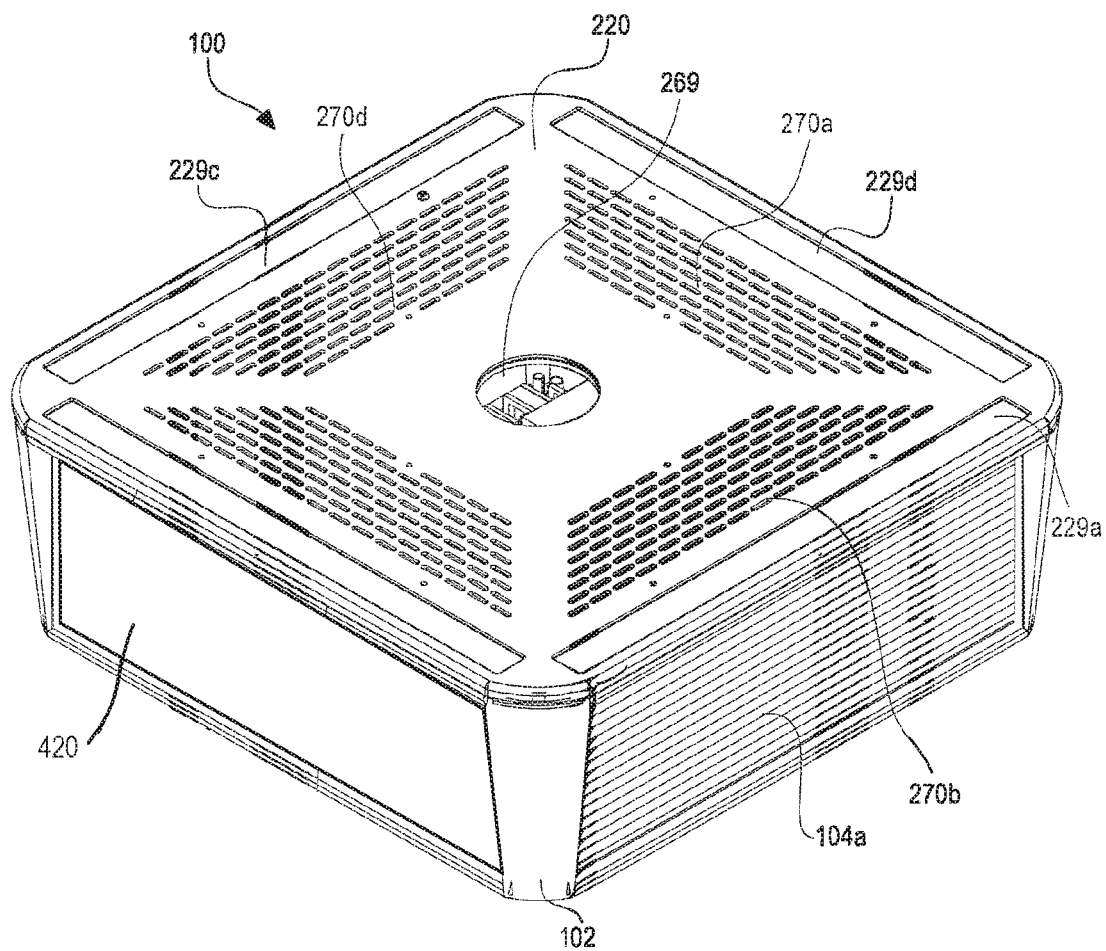
FIG. 33 is a perspective view of a luminaire equipped with a panel to prevent light from being emitted in one direction.

Another design to prevent light from being emitted is replacing the waveguide 104 with a panel 420 as illustrated in FIG. 33. The panel 420 is opaque to prevent light from being emitted outward from the luminaire 100. The panel 420 can include an inner surface that reflects the light back into the luminaire 100 for recycling or reuse in another direction. The panel 420 can also be constructed to be translucent or transparent and include a tinting that reduces the amount and/or characteristics of the light that is emitted from the side.

The panel 420 can be sized and configured to engage with the housing 102 of the luminaire 100. This can include being mounted within the frame of the luminaire 100. In one embodiment, the panel 420 includes outer edges that mate within the receptacles in the housing 102 to provide for the panel 420 to be slid into position. The panel 420 can be the same shape and size as the waveguide 104 to provide for a secure fit.

The outer side of the panel 420 can be configured to be aesthetically consistent with the remainder of the luminaire 100. This can include the panel 420 having various colors and shadings.

Figure 34:
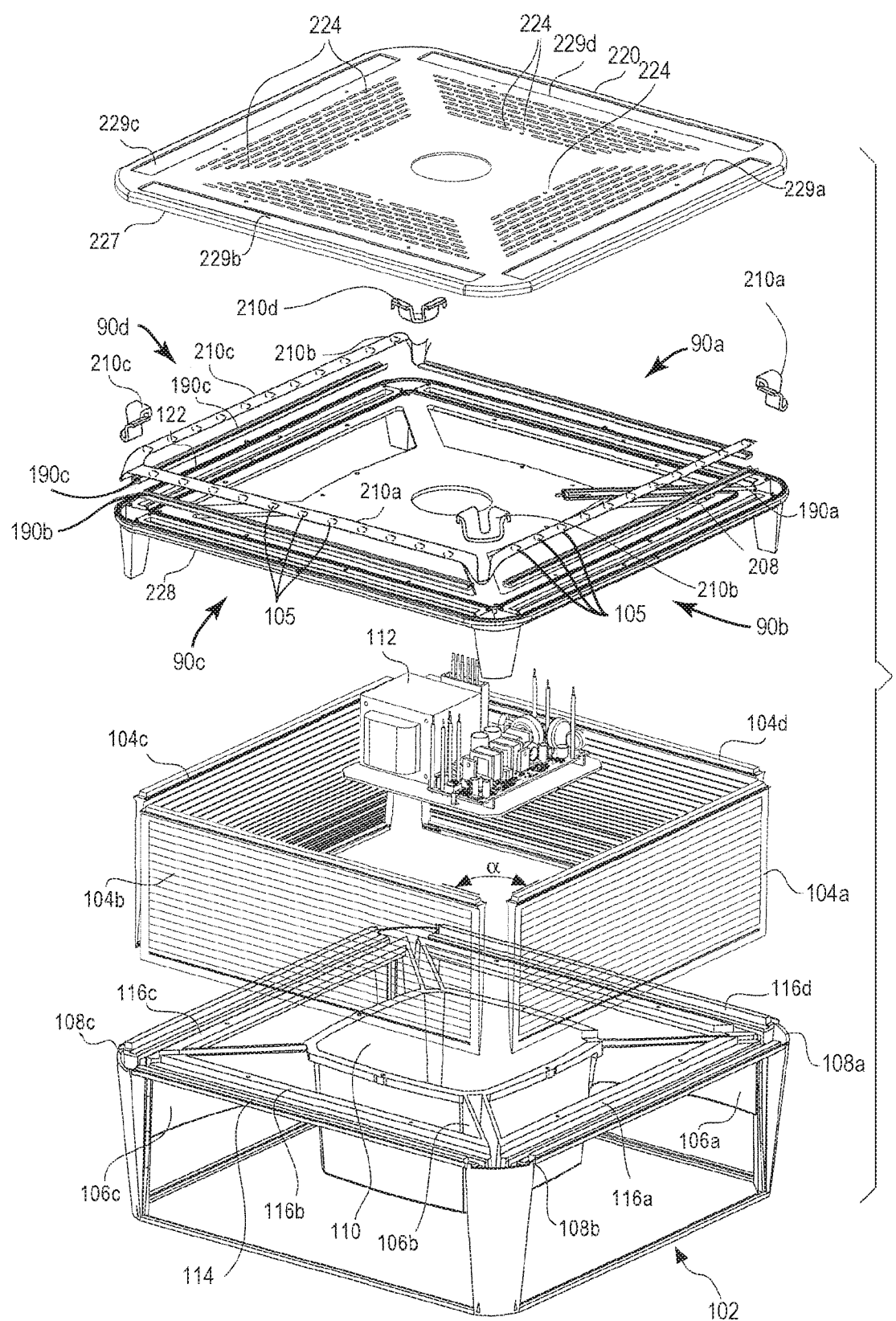
FIG. 34 is an exploded view of a luminaire with LEDs positioned along a limited number of sides.

Another design to prevent light from being emitted is to remove one or more of the LEDs 105 from the luminaire 100. The removed LEDs 105 are those that emit light in the desired direction. FIG. 34 illustrates an embodiment with the LEDs 105 removed from the luminaire 100 along side 90a. Each of the other sides 90b-90d include LEDs 105. The removal of the LEDs 105 prevents light from being emitted in the desired direction.

In one or more embodiments, the devices and configurations of FIGS. 23-34 prevent light from being emitted in one or more directions. In one or more other embodiments, the devices and configurations can be configured to reduce the amount of light that is emitted in the one or more directions. A certain amount of light is still emitted in the one or more directions. However, the amount of light emitted in these directions is less than that which is emitted in the one or more other directions.

The luminaire 100 can be equipped with one or more shields to prevent and/or reduce the light from being emitted in one or more directions. In embodiments with multiple shields, the shields can be the same or can be different. For example, a luminaire 100 can be equipped with a light shield 400 along a first side to prevent light from being emitted from a first side in a first direction, and can include the removal of LEDs 105 from a second side to prevent light from being emitted in a different second direction. In another embodiment, the luminaire 100 is equipped with two light shields 400 mounted on different sides.

INDUSTRIAL APPLICABILITY

The disclosed luminaire provides an aesthetically pleasing, sturdy, cost effective lighting assembly for use in lighting a large area such as a parking lot or deck of a parking garage. The lighting is accomplished with reduced glare as compared to conventional lighting systems. The various devices and configurations further provide for the luminaire to emit light in a limited number of directions. The luminaire can be configured to control these directions.

The extraction features disclosed herein efficiently extract light out of the waveguide. At least some of the luminaires disclosed herein are particularly adapted for use in installations, such as, replacement or retrofit lamps, outdoor products (e.g., streetlights, high-bay lights, canopy lights), and indoor products (e.g., downlights, troffers, a lay-in or drop-in application, a surface mount application onto a wall or ceiling, etc.) preferably requiring a total luminaire output of at least about 800 lumens or greater, and, in some embodiments, a total luminaire output of at least about 7000 lumens, although the total luminaire output depends in part on the desired application. Further, the luminaires disclosed herein preferably have a color temperature of between about 2500 degrees Kelvin and about 6200 degrees Kelvin, and more preferably between about 2500 degrees Kelvin and about 5000 degrees Kelvin, and most preferably between about 4000 degrees Kelvin and about 5000 degrees Kelvin. Also, at least some of the luminaires disclosed herein preferably exhibit an efficacy of at least about 100 lumens per watt, and more preferably at least about 120 lumens per watt. Further, at least some of the optical coupling members and waveguides disclosed herein preferably exhibit an overall efficiency (i.e., light extracted out of the waveguide divided by light injected into the waveguide) of at least about 90 percent. A color rendition index (CRI) of at least about 70 is preferably attained by at least some of the luminaires disclosed herein, with a CRI of at least about 80 being more preferable. Any desired particular output light distribution, such as a butterfly light distribution, could be achieved, including up and down light distributions or up only or down only distributions, etc.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present disclosure, light is coupled into the optic, where primarily TIR is used for re-direction and collimation. This coupling allows the full range of angular emission from the source, including high-angle light, to be re-directed and collimated, resulting in higher optical efficiency in a more compact form factor.

In at least some of the present embodiments, the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following enumerated embodiments) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise specified. No language in the specification should be construed as indicating any aspect as essential to the practice of the disclosure.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended enumerated embodiments are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A luminaire, comprising:
   a frame with a plurality of sides, the sides comprising a top, a bottom, and lateral sides that extend between the top and the bottom, the lateral sides further comprising corner members that extend between the top and the bottom and with openings positioned between the corner members;
   a plurality of optical waveguides disposed in the openings in the frame, the plurality of optical waveguides positioned at different angles relative to one another to direct light outward in multiple different directions;
   at least one LED associated with each optical waveguide; and
   a shield connected to the frame and configured to reduce the light from being directed in one of the different directions, the shield comprising a mask area and extensions that extend outward from opposing sides of the mask area;
   the extensions positioned to extend outward beyond the mask area to extend over the top of the frame and also to engage with the corner members, the extensions configured to attach the shield to the frame with the extensions positioned on opposing sides of the frame and with the mask area extending across the one optical waveguide without extending into the other lateral sides of the frame and with each of the extensions exposed on an exterior of the frame when the shield is attached to the frame.

2. The luminaire of claim 1, wherein the mask area is larger than the opening and extends completely across the opening and partially over the corner members that are adjacent to the opening.

3. The luminaire of claim 2, wherein the extensions that engage the top of the frame each comprise an ear configured to extend across the top of the frame and a tab that is angled relative to the ear to extend outward above the top of the frame.

4. The luminaire of claim 1, wherein the shield comprises a diffuse reflecting surface that faces towards the optical waveguide to reflect light emitted from the at least one LED that is associated with the optical waveguide.

5. The luminaire of claim 1, wherein the plurality of optical waveguides comprise four optical waveguides that define a rectangular closed path and the shield is mounted at one of the optical waveguides.

6. The luminaire of claim 1, wherein the shield comprises a reflective inner surface that faces towards the frame.

7. The luminaire of claim 1, further comprising a drain opening that extends through the frame and comprises an outlet at the bottom of the frame and with the shield positioned away from the outlet.

8. The luminaire of claim 1, wherein the mask area comprises perforations that allows for a portion of the light to pass through the shield.

9. A luminaire, comprising:
a frame comprising a top and a bottom and a plurality of sides that are positioned between the top and bottom, the plurality of sides separated by support members that extend between the top and the bottom;
at least two light-emitting sections positioned in the frame, each of the light-emitting sections configured to emit light outward from one of the sides of the frame, each of the light-emitting sections comprising:
one or more LEDs;
an optical waveguide disposed in the frame and configured to receive light from the one or more LEDs and to direct the light outward from one of the sides of the frame, wherein each of the optical waveguides comprises first and second opposite waveguide ends, a coupling portion disposed at the first waveguide end, and a light projecting portion disposed between the first and second waveguide ends; and
a shield configured to be positioned on the frame and comprising a mask area that extends over one of the light-emitting sections and extensions that extend over and are exposed on outer sections of the frame, the shield configured to extend over the light emitting section to emit less light outward from one of the sides of the frame relative to each of the light-emitting sections and the extensions positioned to engage with the support members and away from the one or more other light-emitting sections to prevent shielding the light from these light-emitting sections.

10. The luminaire of claim 9, wherein the shield prevents the light from being emitted from the one side.

11. The luminaire of claim 9, wherein the shield extends across an entirety of the optical waveguide.

12. The luminaire of claim 11, wherein the extensions comprise one or more upper extensions that comprise ears that extend outward from a back of the mask area to extend over the top of the frame.

13. The luminaire of claim 9, wherein the mask area and the optical waveguides comprise a common shape and size.

14. The luminaire of claim 9, wherein the frame comprises a rectangular shape with four sides and the light-emitting sections extend along three of the sides and the shield extends along one of the sides and the shield is positioned away from the three light-emitting sections.

15. The luminaire of claim 9, further comprising a rib that extends across one side of the mask area and is laterally offset from the mask area.

16. A method of reducing light emitted by a luminaire, the method comprising:
powering a first LED associated with a first light-emitting section on a first side of the luminaire and receiving light from the first LED into a first optical waveguide disposed on the first side and directing the light outward in a first direction through a light projecting portion of the first optical waveguide that is disposed between first and second waveguide ends;
powering a second LED associated with a second light-emitting section on a second side of the luminaire and receiving light from the second LED into a second optical waveguide disposed on the second side and directing the light outward in a second direction through a light projecting portion of the second optical waveguide that is disposed between first and second waveguide ends; and
attaching a shield to the luminaire and shielding the first light-emitting section and reducing the light that is emitted outward from the luminaire in the first direction while continuing to direct a same amount of the light outward in the second direction from the second light-emitting section, the shielding comprising positioning a mask area of the shield over the first optical waveguide and securing the mask area by positioning upper extensions over a top of a frame that supports the first and second optical waveguides and positioning lower extensions over a bottom of the frame and with at least one of the extensions comprising an ear that contacts against the frame and a tab that extends outward from the ear and angles relative to the ear and away from the frame.

17. The method of 16, wherein shielding the first light-emitting section comprises positioning the shield completely across the first optical waveguide.

18. The method of 16, wherein installing the shield over the light projecting portion of the optical waveguide comprises positioning the shield over a limited section of the light projecting portion.

19. The method of claim 16, further comprising attaching the shield to the luminaire without using a tool.

20. The method of claim 18, further comprising snapping the shield onto the luminaire and applying a compressive force onto the top and bottom of the frame to maintain the shield attached to the luminaire.

* * * * *

UNITED STATES PATENT AND TRADEMARK OFFICE
CERTIFICATE OF CORRECTION

PATENT NO. : 10,969,535 B2  
APPLICATION NO. : 16/394629  
DATED : April 6, 2021  
INVENTOR(S) : Bernd R. Sieberth and Brad Thomas Page 1 of 1

It is certified that error appears in the above-identified patent and that said Letters Patent is hereby corrected as shown below:

In the Claims

Claim 20, Column 24, Line 50, replace "The method of claim 18" with --The method of claim 19--.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*